(12) United States Patent
Fukumoto et al.

(10) Patent No.: US 10,834,284 B2
(45) Date of Patent: *Nov. 10, 2020

(54) IMAGE DISPLAY OPERATION DEVICE AND IMAGE FORMING APPARATUS INCLUDING THE IMAGE DISPLAY OPERATION DEVICE

(71) Applicant: Sharp Kabushiki Kaisha, Sakai (JP)

(72) Inventors: Tetsuo Fukumoto, Sakai (JP); Takeshi Tani, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/729,671

(22) Filed: Dec. 30, 2019

(65) Prior Publication Data

US 2020/0137250 A1    Apr. 30, 2020

Related U.S. Application Data

(63) Continuation of application No. 15/996,591, filed on Jun. 4, 2018, now Pat. No. 10,554,837, which is a
(Continued)

(30) Foreign Application Priority Data

Aug. 27, 2010   (JP) ................................. 2010-190590

(51) Int. Cl.
*G03G 15/00*   (2006.01)
*H04N 1/00*    (2006.01)

(52) U.S. Cl.
CPC ....... *H04N 1/00811* (2013.01); *G03G 15/502* (2013.01); *G03G 15/5016* (2013.01);
(Continued)

(58) Field of Classification Search
CPC ............. G03G 15/5016; G03G 15/502; G03G 15/5087; H04N 1/00811; H04N 1/00411;
(Continued)

(56) References Cited

U.S. PATENT DOCUMENTS

2009/0091770 A1* 4/2009 Kano ................. H04N 1/00132
358/1.1

OTHER PUBLICATIONS

Fukumoto et al., "Image Display Operation Device and Image Forming Apparatus Including the Image Display Operation Device", U.S. Appl. No. 15/996,591, filed Jun. 4, 2018.

* cited by examiner

*Primary Examiner* — Hoang X Ngo
(74) *Attorney, Agent, or Firm* — Keating & Bennett, LLP

(57) ABSTRACT

An image forming apparatus includes a document reader, a storage for storing image data, an image output unit and a control unit. The control unit includes: a function setup controller for setting up the image output conditions of output images; and a control-unit side controller having a function of displaying a function setup screen corresponding to the function setup controller, on a display panel. The function setup controller has an additional input mode having a function of reading documents a multiple number of times to form multiple sheaves of documents. The additional input mode includes: an individual setup function of setting up individual image output conditions for each sheaf of documents and an all-in setup function of setting up identical image output conditions for all sheaves of documents. When the additional input mode is set up, the control unit-side controller offers a display of a setup change suggestion of the image output conditions for the next input on the display screen at the stage where the first image data input has been completed.

8 Claims, 14 Drawing Sheets

Related U.S. Application Data continuation of application No. 15/428,257, filed on Feb. 9, 2017, now Pat. No. 10,015,340, which is a continuation of application No. 15/227,025, filed on Aug. 3, 2016, now Pat. No. 9,609,154, which is a continuation of application No. 14/749,287, filed on Jun. 24, 2015, now Pat. No. 9,436,144, which is a continuation of application No. 13/199,402, filed on Aug. 26, 2011, now Pat. No. 9,091,986.

(52) U.S. Cl.
CPC ....... *G03G 15/5087* (2013.01); *H04N 1/0044* (2013.01); *H04N 1/00411* (2013.01); *H04N 1/00413* (2013.01); *H04N 1/00474* (2013.01); *H04N 1/00482* (2013.01); *H04N 1/00501* (2013.01); *H04N 1/00973* (2013.01); *G03G 2215/00109* (2013.01); *H04N 2201/0082* (2013.01); *H04N 2201/0091* (2013.01); *H04N 2201/0093* (2013.01); *H04N 2201/0094* (2013.01)

(58) Field of Classification Search
CPC ............. H04N 1/00413; H04N 1/0044; H04N 1/00474; H04N 1/00482; H04N 1/00501; H04N 1/00973
See application file for complete search history.

IMAGE DISPLAY OPERATION DEVICE AND IMAGE FORMING APPARATUS INCLUDING THE IMAGE DISPLAY OPERATION DEVICE

This Nonprovisional application claims priority under 35 U.S.C. § 119 (a) on Patent Application No. 2010-190590 filed in Japan on 27 Aug. 2010, the entire contents of which are hereby incorporated by reference.

BACKGROUND OF THE INVENTION

(1) Field of the Invention

The present invention relates to an image forming apparatus such as a copier, printer, facsimile machine or the like, in particular, relating to an image forming apparatus having a function of setting up the image output conditions of images to be output based on input image data.

(2) Description of the Prior Art

Recently, there have been known image forming apparatus that include an input means having a function of receiving additional input of image data and an output means performing image output based on the image data input through the input means, and have a function of setting up the image output conditions of the images to be output by the output means. In such an image forming apparatus, it is possible to simply set up and/or change the image output conditions of images to be output before execution of the job.

As a prior art, there has been disclosed an image forming apparatus having a function of reading documents several times (for example, continuous reading and copying function), in which the display screen is switched from the preview of the currently displayed document sheaf to the preview of the document sheaf that has been scanned before or after the current one, by operating the forward jump button or backward jump button (see Patent Document 1: Japanese Patent Application Laid-open 2008-306469).

Here, the continuous reading and copying function means a function in which when documents are scanned by using an automatic document feeder, images of documents, which have been set and scanned multiple times by the automatic document feeder, are output collectively.

In general, when the continuous reading and copying function is used, the continuous reading mode is set up as the operation mode. Then, a document or a multiple number of documents are set and the start key is pressed so as to perform reading of the set documents. When the reading of the set documents has been completed, another set of documents is placed and the start key is pressed. This process is repeated.

When reading of all the documents has been completed in the above way, the continuous reading end key is pressed. When the continuous reading end key is pressed, printing of the scanned images is started.

According to the above-described image forming apparatus, when document images have been captured by the continuous reading and copying function, it is possible to promptly switch the preview display from the currently displayed document sheaf to the document sheaf that has been read previously or subsequently.

However, the technology in Patent Document 1 only discloses the continuous reading and copying function when documents are continuously scanned a multiple number of times, whereas there is no reference to setup of image output conditions for outputting images at the second reading and after, such as one-sided or dual-sized printing, printing of two pages on one sheet, color printing or monochrome printing and others. Therefore, there is the problem that if the user wants to make setup of image output conditions different between one document sheaf and another, it is impossible to deal with such a situation.

SUMMARY OF THE INVENTION

The present invention has been devised in view of the above prior art problems, it is therefore an object of the present invention to provide an image forming apparatus that enables the user to set up image output conditions in accordance with the finish the user wants when image data of documents etc. is continuously scanned a multiple number of times.

The first aspect of the invention resides in an image forming apparatus comprising:
an input unit having a function of receiving additional input of image data;
a storing unit storing the image data input from the input unit;
an output unit for performing image output based on the image data stored in storing unit; and,
an image display control device, and is characterized in that the image display control device includes:
a function setup controller having a function of setting up image output conditions of an image to be output from the output unit;
a function setup image preparation controller for preparing a function setup screen that is related so as to actuate the function setup controller;
a display unit having a display screen for displaying the function setup screen; and,
a display controller having a function of displaying the function setup screen on the display unit,
the function setup controller has an additional input mode having a function of receiving separate input of image data a multiple number of times to form a set of image data at every input,
the additional input mode includes:
an individual setup function of setting up individual image output conditions for each set of image data at every input; and,
an all-in setup function of setting up identical image output conditions for all sets of image data input individually,
the display controller offers a display of a setup change suggestion of the image output conditions for the next input, on the display screen at the stage where the first image data input has been completed when the additional input mode is set up.

The second aspect of the present invention resides in that, when the additional input mode is set up and if the second image output conditions for additionally input image data are different from the first image output conditions for the previously input image data, the function setup controller makes the second image output conditions valid for only the image data that is additionally input after the second image output conditions has been set up.

The third aspect of the present invention resides in that, when the additional input mode is set up, the function setup controller makes it possible to set up the second image output conditions for additionally input image data in the same manner as the first image output conditions for the previously input image data is set up.

The fourth aspect of the present invention resides in that, when the additional input mode is set up, the display controller displays a single control key as the control key for directing the image output.

For example, as an operation key for directing a start of printing, a single copy start key may be displayed instead of displaying two start keys, i.e., a start key for monochrome copy and a start key for color copy.

The fifth aspect of the present invention resides in that, when the additional input mode is set up, at the stage where additional input is completed after setup change of the image output conditions for additionally input image data, the display controller displays a setup directing key for setting up identical output conditions for all the multiple sets of image data, on the display screen of the display unit.

The sixth aspect of the present invention resides in that, when the additional input mode is set up and when a direction of setting up identical image output conditions for all the multiple sets of image data is given, the function setup controller makes it possible to set up a finishing process for all the multiple sets of image data.

In the present invention, the finishing process may include a process implemented by a post-processor such as stapling, punching or the like to bind the paper with images printed thereon when the paper is output after the completion of image forming in the image forming apparatus.

The seventh aspect of the present invention resides in that, when the additional input mode is not set up and if the second image output conditions for the additionally input second image data are different from the first image output conditions for the previously input first image data, the function setup controller makes the second image output conditions valid for both the first image data and the second image data.

According to the first aspect of the present invention, it is possible for the user to use a different mode in accordance with the finish the user wants.

It is also possible to perform additional input by designating different settings from those for the first input of image data.

According to the second aspect of the present invention, it is possible to make the settings different before and after an additional input.

According to the third aspect of the present invention, it is possible to designate new settings different from the previous settings in order to change the setup for each set of image data.

According to the fourth aspect of the present invention, displaying only a single control key enables the user to start copying without confusion. That is, in the additional input mode, color designation may be different from one unit of image data to another, and if there are multiple control keys for directing copy start the user may be confused. This configuration can prevent this.

According to the fifth aspect of the present invention, it is possible to set up a finishing process for all the sets of image data that have been input.

According to the sixth aspect of the present invention, it is possible to produce image output that is finished in complex combination of settings in accordance with the conditions the user wants.

Specifically, for example, multiple sheaves of documents (sets of image data) each having different settings such as dual-sided setting, color mode, page integration, etc., can be stapled as a whole while keeping up the different settings, this realizing a new way of usage, that is, production of integrated printed matter.

According to the seventh aspect of the present invention, it is possible to designate the same settings for all the sets of image data that have been input.

DESCRIPTION OF THE PREFERRED EMBODIMENTS

The embodiment of the present invention will hereinafter be described with reference to the accompanying drawings.

Figure 1:
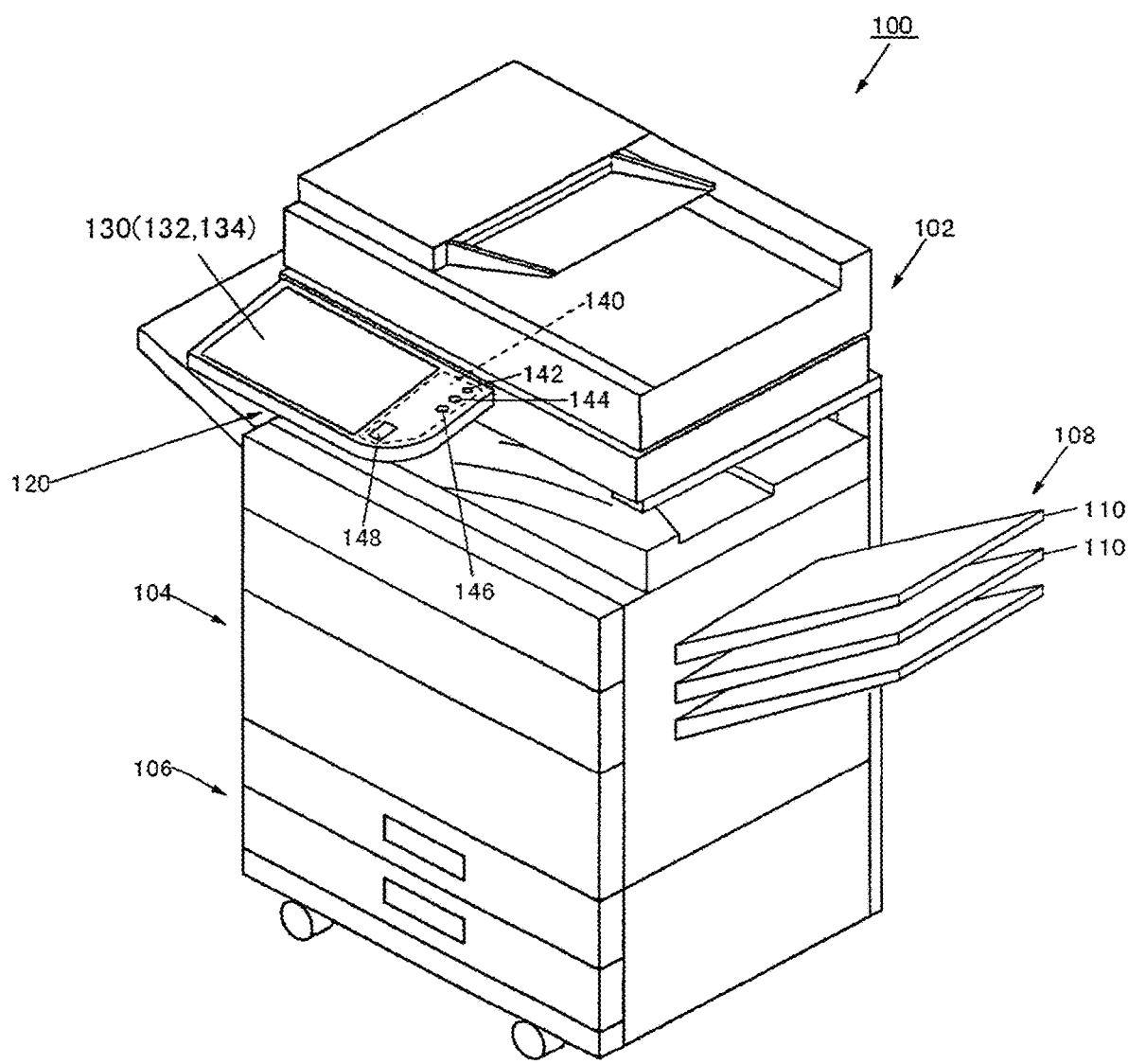
FIG. 1 is an illustrative view showing an overall configuration of an image forming apparatus according to the embodiment of the present invention.
Figure 2:
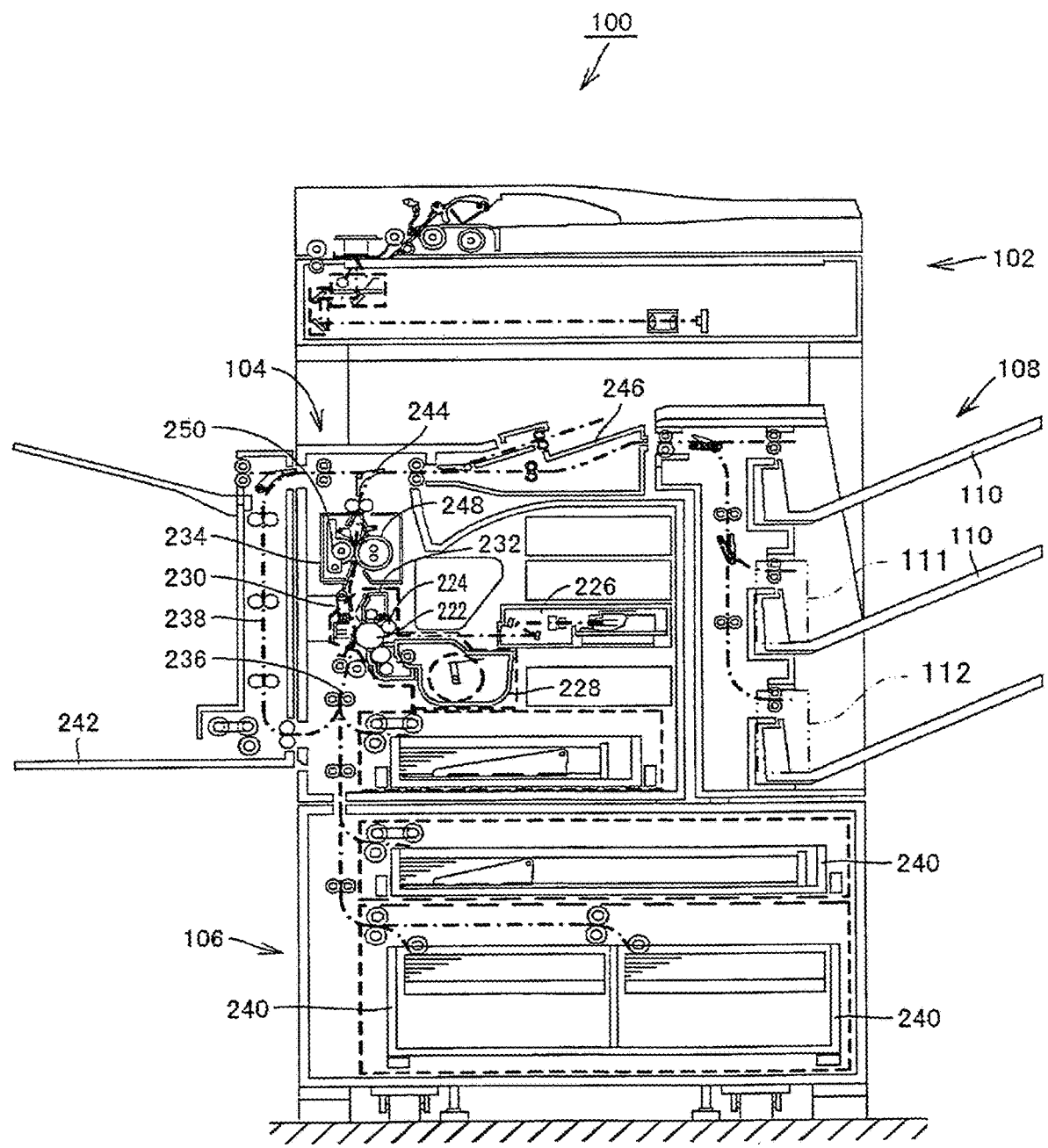
FIG. 2 is an illustrative view schematically showing the internal mechanisms of the image forming apparatus.
Figure 3:
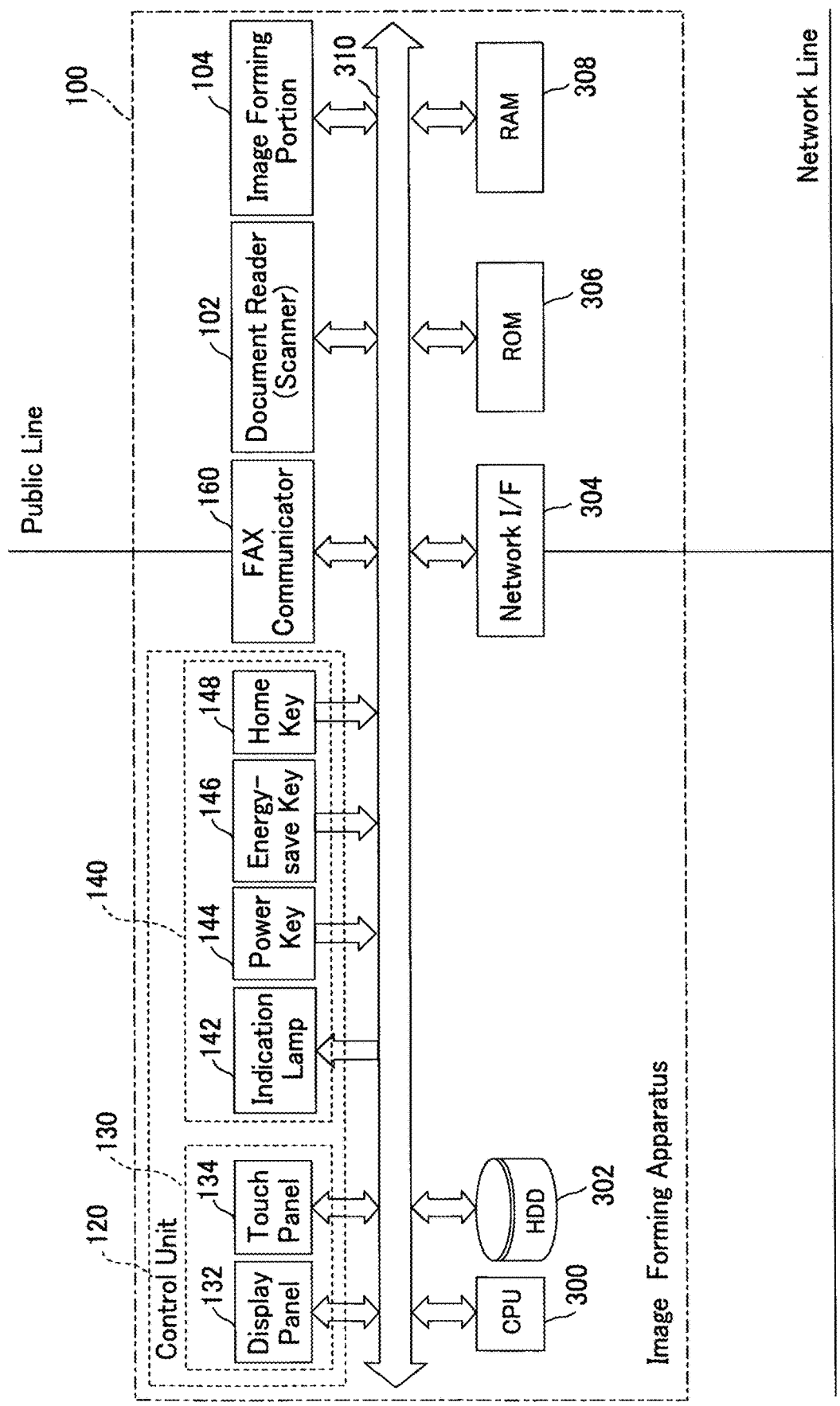
FIG. 3 is a functional block diagram showing a hardware configuration of the image forming apparatus.
Figure 4:
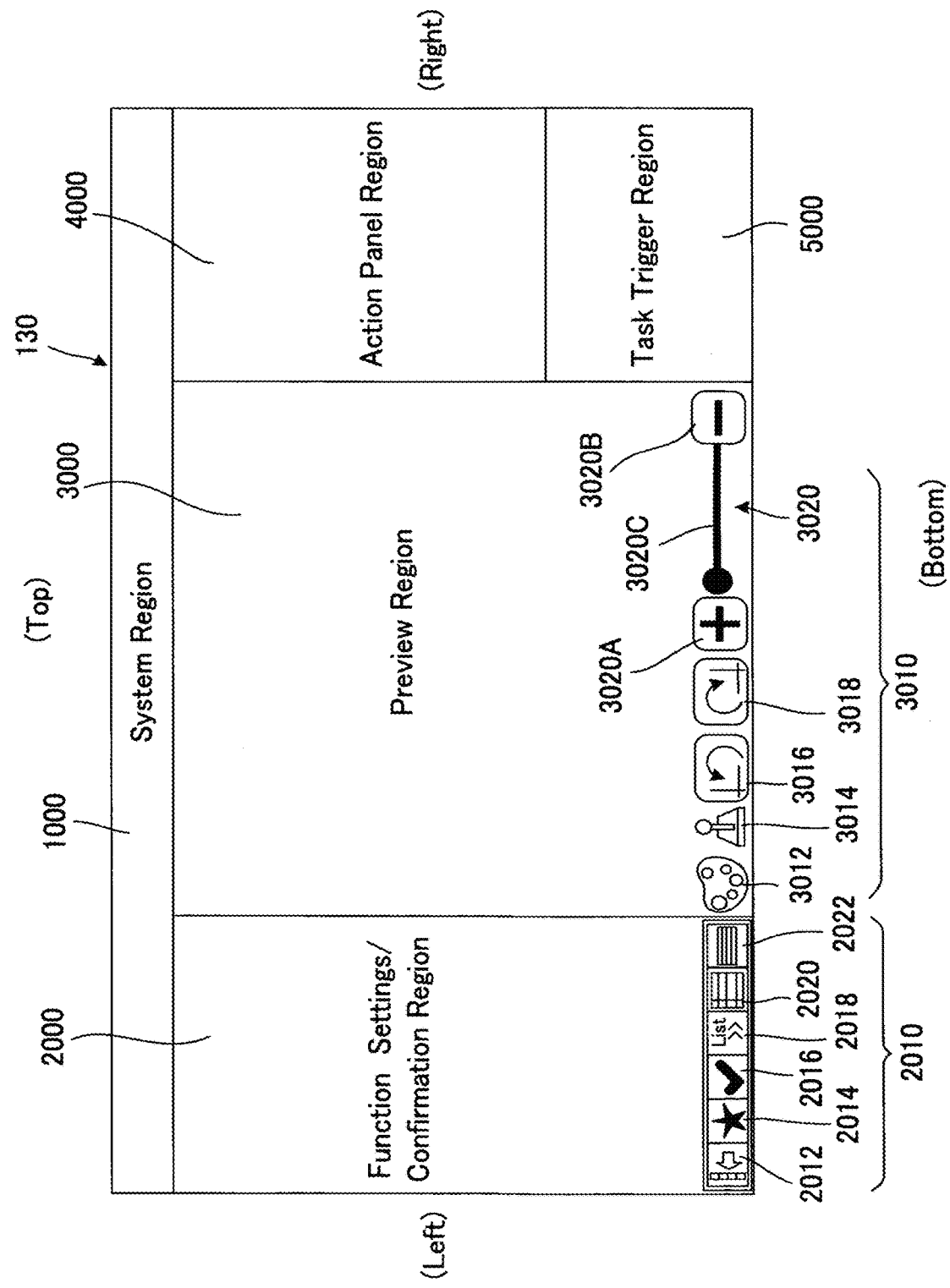
FIG. 4 is an illustrative view showing display regions on a touch panel display of the image forming apparatus.
Figure 5:
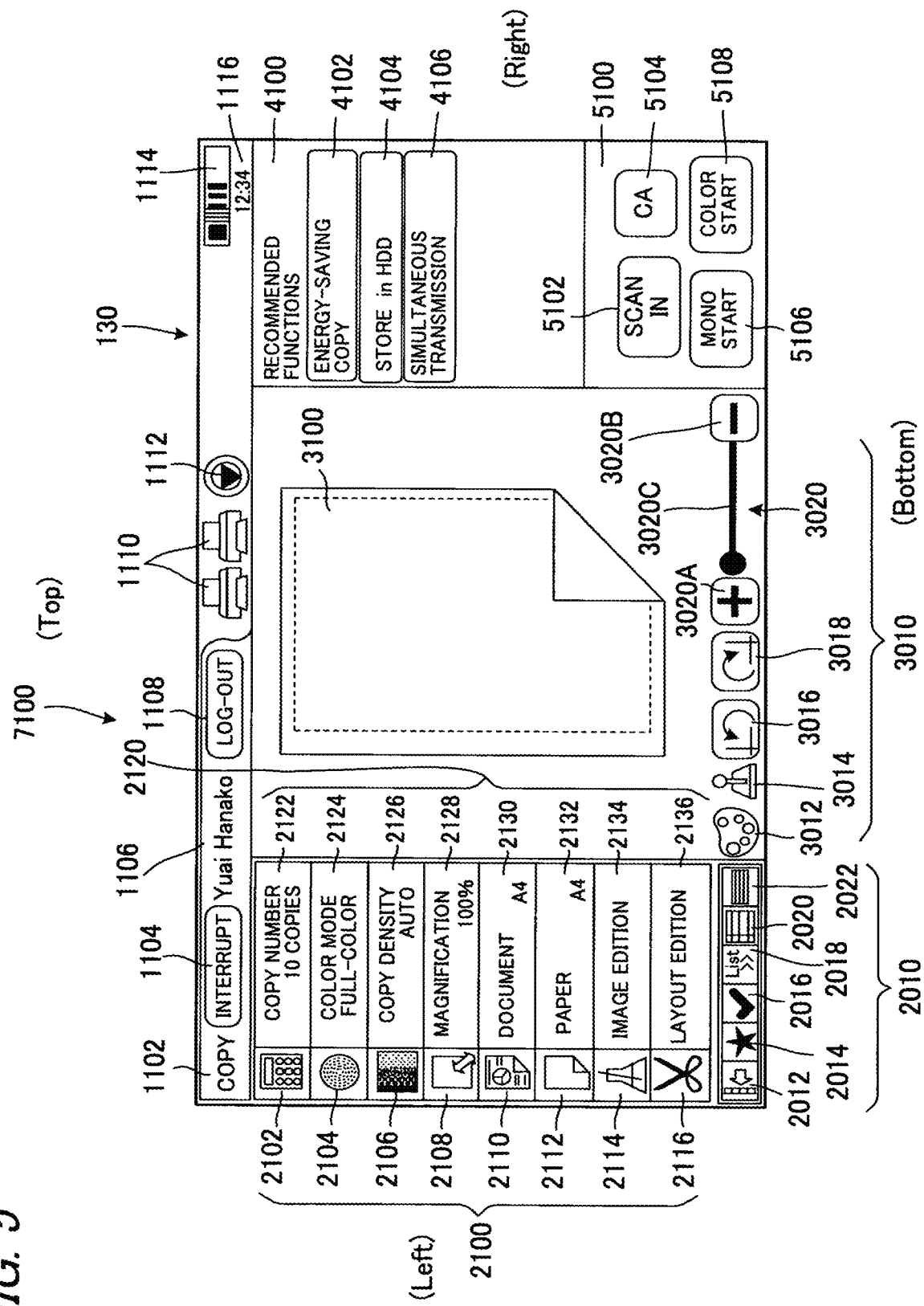
FIG. 5 is an illustrative view showing a screen example displayed on the touch panel display.

FIG. 1 is an illustrative view of one example mode of carrying out the present invention, showing an overall configuration of an image forming apparatus according to the embodiment of the present invention. FIG. 2 is an illustrative view schematically showing the internal mechanisms of the image forming apparatus. FIG. 3 is a functional block diagram showing a hardware configuration of the image forming apparatus. FIG. 4 is an illustrative view showing preview display region on a touch panel display of the image forming apparatus. FIG. 5 is an illustrative view showing a screen example displayed on the touch panel display.

An image forming apparatus 100 according to the embodiment of the present invention includes, as shown in FIG. 1, includes: a document reader (input unit) 102 having a function of receiving additional input of image data; an image forming portion (output unit) 104 for forming an image on a recording medium based on the image data input through document reader 102; and a control unit (image display control device; display controller) 120 including a display panel (display portion) 132 for displaying preview images in a preview representation, based on image data and having a function of displaying display images based on the image data input from document reader 102 and a function of setting up the image output conditions of images output on the recording medium from image forming portion 104.

Control unit 120 functioning as the display controller has a function of setting up the image output conditions of images output from image forming portion 104 and is configured so that the image output conditions of images to be output can be set up on display panel 132.

The multiple document images displayed on display panel 132 may include preview display images of document images captured by the document reader etc., of image forming apparatus 100 and preview images of finished images to be formed on recording paper by the image forming portion.

Image forming apparatus 100 is a kind of an image processing apparatus. The image display control device according to the present invention is also applicable to image processing apparatus and electronic appliances other than the image forming apparatus of this kind.

Further, image forming apparatus 100 includes a plurality of operational modes, and is equipped with a display device for displaying information for each operational mode. The display device is preferably constructed so as to be able to display information the user wants in a user friendly manner even if the user does not remember the screen configuration when the operational mode is changed over.

Here, image forming apparatus 100 includes a touch panel display (control screen) that can be controlled by both gesture control and touch control other than gesture control, but the image forming apparatus may use a touch panel display that can be controlled by touch control only. Alternatively, the image forming apparatus may include a display panel that cannot be touch-controlled but can display only, with keys for control.

Here, gesture control means controls that are related to various kinds of movements of fingers in combination with GUI (Graphic User Interface), such as responses in accordance with the distance moved and speed of the fingers, double-tapping, the moving fingers trace and the like that are given with meanings.

This image forming apparatus 100 forms images on recording paper based on electrophotography.

Image forming apparatus 100 includes, as its operation modes, copy mode, facsimile mode (FAX mode), document filing mode (a mode in which scanned images are stored in a storage inside the image forming apparatus) and mail mode (a mode in which scanned images are transmitted in the form of an attachment file to an e-mail). This image forming apparatus 100 may further have a network printer mode.

The image forming apparatus 100 of the present embodiment changes the display content on the screen every time the operation mode is switched as shown in FIG. 1. Further, the printing mechanism is not limited to electrophotography.

To begin with, image forming apparatus 100 will be described.

Image forming apparatus 100 according to the present embodiment includes document reader 102, image forming portion 104, a paper feed portion 106, a paper output processor 108 and a control unit 120, as shown in FIG. 1.

Control unit 120 is formed of a touch panel display 130 and a display control portion 140. Touch panel display 130 is comprised of a display panel 132 of a liquid crystal panel or the like and a touch panel (touch control detecting means) 134 that is laid over display panel 132 to detect the positions the user presses with fingers. Display control portion 140 includes an indication lamp 142, a power key 144, an energy-save key 146 and a home key 148 that resets the display content of touch panel display 130 to the home screen for operational mode selection.

In this way, image forming apparatus 100 has touch panel display 130 as a main control device and also has a display control portion 140 that includes the hardware keys and indication lamps. The keys (power key 144, energy-save key 146 and home key 148) on display control portion 140 are given as hardware buttons, in contrast to software buttons formed by touch panel display 130.

Note that image forming apparatus 100 should not be limited to that including display control portion 140 of this kind, but may be provided with touch panel display 130 only. That is, it will work as long as the initial screen of the selected operational mode can be actuated when the user selects an operational mode on the home screen displayed on touch panel display 130. Next, the operational modes of this image forming apparatus 100 will be described.

(Copy Mode)

The operation of the copy mode of image forming apparatus 100 will be described.

In this copy mode, image reader (which will be referred to hereinbelow as "scanner") 102 and image forming portion 104 operate mainly.

A document placed on a document placement table is read as image data by scanner 102 and the read image data is input to a CPU 300 of a microcomputer etc. shown in FIG. 3, where the image data undergoes various kinds of image processing, and the processed image data is output to image forming portion 104.

As shown in FIG. 2, image forming portion 104 is a mechanism that prints images of documents given as image data onto recording mediums (recording paper in most cases), including a photoreceptor drum 222, a charging device 224, a laser scan unit (which will be referred to hereinbelow as "LSU") 226, a developing device 228, a transfer device 230, a cleaning unit 232, a fixing unit 234, an unillustrated charge eraser and other devices.

Also, image forming portion 104 is provided with a main feed path 236 and a reverse feed path 238. The recording paper fed from paper feed portion 106 is conveyed along main feed path 236. Paper feed portion 106 draws recording paper, one sheet at a time, from a stack of recording paper, held in a paper feed cassette 240 or set on a manual feed tray 242 and delivers the recoding paper to main feed path 236 of image forming portion 104.

In the course of the recording paper being conveyed along main feed path 236 of image forming portion 104, the recording paper passes through and between photoreceptor drum 222 and transfer device 230 and then passes through fixing device 234 to perform printing for the recording paper.

While photoreceptor drum 222 rotates in one direction, its surface is cleaned by cleaning device 232 and the charge erasing device, then uniformly electrified by charging device 224.

LSU 226 modulates the laser beam based on the image data to be printed and repeatedly scans the laser beam over the photoreceptor drum 222 surface in the main scan direction, to form an electrostatic latent image on the photoreceptor drum 222 surface.

Developing unit 228 supplies toner to the photoreceptor drum 222 surface and develops the electrostatic latent image to form a toner image on the photoreceptor drum 222 surface.

Transfer device 230 transfers the toner image on the photoreceptor drum 222 surface to the recording paper which passes through the nip between the transfer device 230 and photoreceptor drum 222.

Fixing device 234 includes a heat roller 248 for heating recording paper and a pressing roller 250 for pressing recording paper. The recording paper is heated by heat roller 248 and pressed by pressing roller 250 so that the toner image transferred to the recording paper is fixed to the recording paper. A heater in the heat roller is heated by the power supplied to this fixing unit 234 so as to control and keep heat roller 248 at a temperature suitable for fixing. When the apparatus enters the energy saving mode, for instance the power supplied to this heater is stopped or cut down.

Arranged at the junction between main feed path 236 and reverse feed path 238 is a branch claw 244. When printing is performed on one side of recording paper only, branch claw 244 is positioned so as to lead the recording paper from fixing device 234 toward a paper output tray 246 or paper output processor 108.

When printing is performed on both sides of recording paper, branch claw 244 is rotated in the predetermined direction so that the recording paper is once conveyed toward the paper output tray 246 side. Then, the paper is switched back and conveyed toward reverse feed path 238. The recording paper then passes through reverse feed path 238 and is inverted upside down and fed to main feed path 236 again. The recording paper is once again printed on its rear side in the course of main feed path 236 and lead to paper output tray 246 or paper output processor 108.

The recording paper thus printed is lead to paper output tray 246 or paper output processor 108 and discharged to either paper output tray 246 or each of paper output trays 110 of paper output processor 108.

In paper output processor 108, a plurality of recording sheets are sorted and discharged to individual paper output trays 110, and/or each set of recording sheets is punched or stapled. For example, when multiple copies of printed documents are prepared, the printed recording sheets are sorted and discharged to paper output trays 110 so that one copy of the printed documents is allotted to individual paper output tray 110, and the printed documents on each paper output tray 110 are punched by a punching unit 111 or stapled by a stapling unit 112 to prepare individual printed material.

(Facsimile Mode)

Next, the operation in facsimile mode will be described.

In this facsimile mode, the transmitting operation is mainly effected by document reader (scanner) 102 and a FAX communicator 160, as shown in FIG. 3. The receiving operation is mainly effected by FAX communicator 160 and image forming portion 104.

(Transmitting Operation)

The transmitting operation is performed by the steps of: selecting the facsimile mode, reading image data from a document placed on the document placement table by means of document reader 102, supplying the read image data to CPU 300 made up of a microcomputer etc. shown in FIG. 3 where the image data is subjected to various kinds of image processes, and outputting the thus obtained image data to the FAX communicator (FAX communicator 160 in FIG. 3).

As shown in FIG. 3, FAX communicator 160 of the transmission side image forming apparatus 100 connects the selected transmitter side line to the designated destination, converts the image data into communication data conforming to the facsimile communication standard and transmits the communication data to the receiver side facsimile machine (e.g., image forming apparatus 100 having a facsimile function).

(Communication Operation)

When connection of the line is established, FAX communicator 160 of image forming apparatus 100 on the receiver side detects a communication request signal from FAX communicator 160 of image forming apparatus 100 on the transmitter side and sends a response signal. Then, for example, FAX communicators 160 on both the transmitter and receiver sides exchange facsimile performance information of their own with each other and determine the communication rate and coding and code correction scheme of the image data within the available maximum capacity to set up a modem communication scheme. The data is transmitted based on this communication scheme, from FAX communicator 160 of image forming apparatus 100 on the transmitter side to FAX communicator 160 of image forming apparatus 100 on the receiver side. When data transmission is ended, the line is cut off.

(Receiving Operation)

The FAX communicator 160 of image forming apparatus 100 on the receiver side converts the received data into image data and sends the data to image forming portion 104. Here, the received data may be converted into image data by image forming portion 104. Image forming portion 104 prints images of documents represented by the image data converted from the received data, onto recording paper, in the same manner as the above-described operation in copy mode.

Next, the control block configuration of image forming apparatus 100 will be described with reference to the drawings.

As shown in FIG. 3, image forming apparatus 100 includes: control unit 120 that allows the user to set copy mode and facsimile mode; a ROM 306 for storing programs etc.; a hard disk 302 serving as a non-volatile storage area that can hold programs, data and the like even if the power is cut off; and a RAM (Random Access Memory) 308 that offers a storing area when a program is executed.

Image forming apparatus 100 further includes: a bus 310 connected to image reader 102, image forming portion 104, FAX communicator 160, control unit 120, ROM 306, hard disk 302 and RAM 308; and CPU 300 that is connected to bus 310 to realize general functions as an image forming apparatus.

Hard disk 302 records (stores) files of image data of documents scanned by the image forming apparatus 100. Hard disk 302 also stores initial screen data for each operational mode. The files and data stored in hard disk 302 can also be recorded in ROM 306.

Stored in ROM 306 are programs, data and the like necessary for controlling the operation of image forming apparatus 100. As the data stored in ROM 306 with the programs, the initial screen data for each operational mode may be stored. CPU 300 controls image forming apparatus 100 in accordance with the programs and data stored in ROM 306 and performs control associated with each function of image forming apparatus 100.

As shown in FIG. 3, a public line for exchange of image data is connected to FAX communicator 160 of this image forming apparatus 100 while a network line is connected to a network interface 304. This network line may be connected to a computers etc. that use this image forming portion 100 as a network printer or may be connected via the Internet to a computer etc. that is identified by a designated URL (Uniform Resource Locator). When connected to the Internet in this way, the image forming apparatus 100 can obtain the necessary information via the Internet.

RAM 308 offers a function as a working memory for temporarily recording the result of the operation and processing by CPU 300 and a function as a frame memory for recording image data.

Control of image reader 102, image forming portion 104, touch panel display 130 and display control portion 140 forming control unit 120, ROM 306, hard disk 302 and RAM 308 is performed by CPU 300 executing predetermined programs. Here, control unit 120 communicates with CPU 300 by way of an input/output interface.

Control unit 120 is given as a board-like panel that is tilted so as to allow the user ease of view. Control unit 120 includes touch panel display 130 in the left area and display control portion 140 (including indication lamp 142 and hardware buttons, namely, power key 144, energy-save key 146 and home key 148) in the right area on the top thereof. Touch panel display 130 and display control portion 140 are integrally provided in control unit 120.

As described above, this touch panel display 130 is formed of display panel 132 and touch panel 134 that is laid over display panel 132.

Displayed on touch panel display 130 are the home screen for selection of the operational mode in this image forming apparatus 100, the current status of this image forming apparatus 100, the status of destination selection, job processing status and the like.

Displayed in the preview display region of display panel 132 are selection buttons as software keys. When the displayed area of a selection button is pushed by a finger, touch panel 134 detects the pushed position. Then, the position on which touch panel 134 is pressed is compared with the positions of selection buttons so as to perform selection of an operational mode of image forming apparatus 100, functional setting, operational instructions, and the like. In addition to this touch control (command input control based on the position of the user's pressing), this image forming apparatus 100 also supports the above-mentioned gesture control (command input control based on the trace of user's control motion).

Further, indication lamp 142 of display control portion 140 is made up of a LED (Light Emitting Diode) for instance and is controlled by CPU 300 so as to turn on/off (/flash on and off). When the user presses down power key 144 that is provided separately in addition to the main power switch, this image forming apparatus 100 comes out of standby mode (in which, for example, only fax reception is permitted with the main power turned on) to active mode so that the whole operational modes of this image forming apparatus 100 can be used. Indication lamp 142 comes on in link with this status. Further, when a predetermined period has elapsed without receiving any user input, or when the user presses energy-save key 146, this image forming apparatus 100 comes out of active mode into energy save mode so that only part of the operational modes of image forming apparatus 100 are operational. Indication lamp 142 flashes on and off in link with this status. Further, when the user presses energy-save key 146 in this energy save mode, the image forming apparatus 100 comes out of energy save mode into active mode. Home key 148 is a hardware key for retuning the display of touch panel display 130 into the initial condition (home screen). It is noted that the operations when power key 144, energy-save key 146 and home key 148 are pressed should not be limited to these.

The hardware keys on display control portion 140 (power key 144, energy-save key 146 and home key 148) may be embedded with a key lamp controlled by CPU 300 so as to turn on/off (/flash). For example, this key lamp may be a round type key ring-like lighting or center lighting. This key lamp turns on at the timing that the hardware key is permitted to use as a control device (at the timing that operation is performed when the hardware key is used).

Image forming apparatus 100 has the aforementioned two operational modes (copy mode and facsimile mode). Software buttons for function settings in each operational mode are displayed on touch panel display 130, and also the preview as the on-screen form of forming images, keys for destination setting and the like are displayed as necessary.

When the operational mode is different from that which the user wants, touch panel display 130 displays another screen. Even in such a case, in order for the user to easily find the information the user requests, touch panel display 130 is divided into multiple regions (which also are given in a size variable manner) so as to display necessary information in each region.

In particular, in this image forming apparatus 100, when one operational mode is selected on the home screen of touch panel display 130 provided as the main display control device, the initial screen of the operational mode is displayed.

In this initial screen, (1) the basic layout is formed of five areas, namely "system region", "function selecting region", "preview region", "action panel region" and "task trigger region", which are appropriately arranged, so that the user is able to easily perform input of settings from top left to bottom right (in the same manner as the user moves their gaze and fingers in the conventional machine which is not provided with a large scale touch panel display 130). Further, (2) the concept of the displays of the five regions is consistent in all operational modes, so that the user is able to operate without confusion when another operational mode is used.

The following description will be given on the configuration of the basic layout.

The basic layout in touch panel display 130 will be described with reference to the drawings.

As shown in FIG. 4, the basic layout of touch panel display 130 is designed in the laterally long touch panel display 130 such that a system region 1000 is arranged at the topmost part, a preview region (preview display region) 3000 in the center of the screen, a function settings/confirmation region 2000 on the left side of preview region 3000, an action panel region 4000 on the upper right part of preview region 3000, and a task trigger region (control key displayed region) 5000 on the lower right of preview region 3000. Here, the laterally long touch panel display 130 is formed of, for example, 1024 pixels wide×600 pixels high. Further, function settings/confirmation region 2000 will be written hereinbelow as function selecting region 2000.

It is noted that the number of regions in touch panel display 130 should not be limited to five. Also, the horizontal arrangement should not be limited so that the horizontal arrangement may be reversed right side left, for example, depending on the user's dominant hand. Further, the position of system region 1000 may be disposed at the lowermost part. Alternatively, the system region 1000 may be undisplayed depending on the status or settings.

System region 1000 displays the current status of this image forming apparatus 100, e.g., the title of the operational mode in control and the status and conditions of image forming apparatus 100. For example, displayed in system region 1000 are the name of operational mode, the cut-in key, the log-in user name, the job status in progress, the usage status of built-in memory, time and the like.

In function selecting region 2000, settings in each function, display switching, function selecting menu (icons, buttons, etc.) operated by user to confirm settings are variably displayed in a selected display style, i.e., in icon mode, regular mode or express mode. In icon mode, only icons for function setting are displayed in function selecting region 2000 so as to maximize the size of preview region 3000. In express mode, the display of function selecting region 2000 is enlarged so as to allow the user to set the function all at once though the size of preview region 3000 is minimized. In regular mode, preview region 3000 is sized between that in the icon mode and that in the express mode while in function selecting region 2000 the text of function titles are displayed together with functional setting icons.

These modes, i.e., icon mode, regular mode and express mode are switched from one to another based on user control. That is, the size of preview region 3000 is modified and displayed in accordance with user control. In this way, since icons are able to give information to the user by using limited area, it is preferable that every function is given with an icon so as to be able to enlarge the display of preview region 3000.

This function selecting region 2000 includes at its bottom a group of select buttons 2010 for switching the display style in function selecting region 2000. Arranged in the group of select buttons 2010 are an icon mode entering button 2012 for displaying function selecting region 2000 in icon mode, a favorite button 2014 for displaying the functions registered as "favorites", a check button 2016 for displaying the functions whose settings have been modified, a list button 2018 for displaying a list of all the functions that can be designated in the selected operation mode, a regular mode entering button 2020 for displaying function selecting region 2000 in regular mode, and an express mode entering button 2022 for displaying function selecting region 2000 in express mode.

Here, when there are many pieces of information to be displayed in function selecting region 2000, the information is displayed in this function selecting region 2000, in a vertically movable manner. In this case, this group of select buttons 2010 is not moved but constantly displayed in the bottom-most portion of function selecting region 2000.

Preview region 3000 displays the image of the output pages of the (finished) document. The image is displayed using dummy data or scanned data, and the displayed image in preview region 3000 is revised every time the user changes the finish. There are two modes of displaying the finish in this preview region 3000: the display of the final preview with a dummy image in virtual mode before scanning and the display of the final preview with actual images in scan-in mode after scanning. The virtual mode further has two types, before setting documents and after setting documents.

At the bottom of this preview region 3000 there is a group of preview select buttons 3010 for changing the display style in preview region 3000. The group of preview select buttons 3010 includes a rotate-left button 3016 for rotating the image left 90 degrees and a rotate-right button 3018 for rotating the image right 90 degrees and a zoom bar 3020. Other than these, for example a change color button 3012 and preview control button 3014 are arranged.

With this, when rotate-left button 3016 is touched once, the preview rotates 90 degrees left. When the button is touched twice, the preview is rotated 180 degrees left (inverted upside down). Alternatively, when the image of the finished document displayed in the preview region is gesture-controlled (by rotating the document image 180 degrees counterclockwise with the fingertip), the preview is rotated 180 degrees left or inverted upside down.

When rotate-right button 3018 is touched once, the preview rotates 90 degrees right. When the button is touched twice, the preview is rotated 180 degrees right (inverted upside down). Alternatively, when the image of the finished document displayed in the preview region is gesture-controlled (by rotating the document image 180 degrees clockwise with the fingertip), the preview is rotated 180 degrees right or inverted upside down.

When the (+) button 3020A of zoom bar 3020 is touched, or when bar 3020C is gesture-controlled (by the "drag or slide" gesture) toward the (+) button 3020A, the preview image is enlarged. Alternatively, when the image of the finished document displayed in the preview region is gesture-controlled (on the document image by the "pinch out/pinch open" gesture with fingertips), the preview image is enlarged. Here, the "drag" gesture is an action of moving the finger. The "pinch out/pinch open" is an action of spreading the two fingertips apart.

When the (−) button 3020B of zoom bar 3020 is touched, or when bar 3020C is gesture-controlled (by "drag or slide" gesture) toward the (−) button 3020B, the preview image is reduced. Alternatively, when the image of the finished document displayed in the preview region is gesture-controlled (on the document image by the "pinch in/pinch close" gesture with fingertips), the preview image is reduced. Here, the "pinch in/pinch close" is an action of bringing the two fingertips together.

When there are many pages of document images to be displayed in preview region 3000, touchable displayed page select buttons (page number input buttons, page up and down buttons, single page display button and multiple page display button, etc.) may be displayed. In this case, it is also possible to turn over or return the page of the document to be previewed by a sliding touch (flicking) of the document image. Further, when the document image to be displayed in preview region 3000 is large, scroll bars that can be touched or gesture-controlled may be displayed. The "flick" gesture is a soft sweeping action with the finger.

Action panel region 4000 displays information such as hint, advice and suggestion for operation and control. Display in this action panel region 4000 is given such that when a particular function is selected by a certain user, the functions associated with the subject function may be displayed, another function as to the subject function may be displayed in a purpose-oriented manner, or the function that was selected in the past in combination with the subject function by the same user or a user of the group to which this user belongs may be displayed as a "recommended function".

Task trigger region 5000 displays trigger items that the user operates in order to actually cause the image forming apparatus 100 to operate after all the settings in the operational mode have been completed. An example is the start button (software button) for starting the operation. Here, since information on a lack of a consumable supply is also related to the unfeasibility of the task in the operational modes needing a printing process (other than fax transmission), this should be also displayed in this "task trigger region".

In this case, it is also preferable that the start button is displayed only when the start button can be pressed down. The condition in which the start button can be pressed down, means a state where all settings have been completed and none of consumable supplies (recording paper and toner) will run short in the case of an operational mode needing a printing operation or a state where all the transmission parameters including destination have been set in the case of a fax mode (transmission) operation as the operational mode needing no printing.

The layout of these five regions is not changed even if the operational mode is switched from one to another (in the initial screen of any operational mode). Further, each region may change in size, expanding or contracting in the horizontal (longitudinal) direction of the screen of touch panel display 130 as in the case where the display of function selecting region 2000 (and preview region 3000) is switched between icon mode, regular mode and express mode.

The layout of the five regions is designed in light of the user interfaces in conventional machines, by directing attention to user's path of gaze and control. This arrangement leads the user to perform settings by moving their gaze from top left to bottom right and moving their input action (fingers of the dominant hand) from top left to bottom right.

In this arrangement, for switching the operational mode from one to another, the user presses down home key 148 (FIG. 3) and selects another operational mode on the home screen. In this way, it is possible to change operational mode by way of the home screen.

(Initial Screen Display Operation in Copy Mode)

When copy mode is selected, the initial screen for copy mode is displayed on touch panel display 130 using copy mode initial screen data loaded from hard disk 302 (FIG. 3) or the like.

In this occasion, a copy mode initial screen 7100 is displayed for example, on touch panel display 130, as shown in FIG. 5. Copy mode initial screen 7100 displays information using the five divided regions laid out as described above.

In system region 1000 (FIG. 4) of copy mode initial screen 7100, areas 1102, 1104, 1106, 1108, 1110, 1112, 1114 and 1116 are laid out as shown in FIG. 5.

Area 1102 denotes the operational mode being selected (copy mode in this case). Displayed in area 1102 is the name and/or icon of the operational mode.

It is also preferred that a pulldown menu showing operational modes is displayed so as to allow for switching of operational mode when this area 1102 is touch-controlled, tapped or double-tapped (the same in other operational modes).

Area 1104 displays sub information entailing the selected operational mode.

In area 1104 a cut-in key (software button) is displayed as sub information. When this cut-in key is touch-controlled, tapped or double-tapped, a cut-in process can be actuated in copy mode.

Area 1106 displays the log-in user name.

In area 1108 a log-out button (software button) is displayed.

Area 1110 displays the status of the job in progress.

Area 1112 displays buttons (software buttons) related to job status.

That is, area 1112 displays the status of the job in progress with an icon. This job status is touch-controlled, tapped or double-tapped, the job status information is displayed in detail. It is further preferable that a button for suspending the selected job and the like is displayed in area 1112.

Area 1114 displays the communication status and area 1116 displays the current time.

Displayed in function selecting region 2000 (FIG. 4) on copy mode initial screen 7100 are a function selecting menu 2100 that allows the user to select in copy mode and a group of select buttons 2010 described above. In the screen shown in FIG. 5, the function select menu is displayed in regular mode.

As shown in FIG. 5, the function select menu displayed in regular mode is composed of a group of icons 2100 and a group of texts 2120. As the function select menu displayed in function selecting region 2000, texts 2122, 2124, 2126, 2128, 2130, 2132, 2134 and 2136 are displayed.

Text 2122 shows an icon 2102 for setting the number of copies and its set content.

Text 2124 shows an icon 2104 for setting color mode and its set content.

Text 2126 shows an icon 2106 for setting copy density and its set content.

Text 2128 shows an icon 2108 for setting copy magnification and its set content.

Text 2130 shows an icon 2110 for setting the document type and its set content.

Text 2132 shows an icon 2112 for setting the paper type and its set content.

Text 2134 shows an icon 2114 for image edition and its set content.

Text 2136 shows an icon 2116 for layout edition and its set content.

Here, it should be noted that a greater number of items can be also displayed in the function setting menu, in a vertically scrollable manner with the position of select buttons 2010 fixed. In this case, the displayed items inclusive of hidden items above and below, can be changed from one to another by any of touch control (scroll control) and gesture control (flick control in the vertical direction).

Here, the image edition is edition for one page document, and includes, as a lower-layered menu, frame deletion, printing menu, watermark, user stamp and the like. The layout edition is edition for multiple pages of documents, and includes, as a lower-layered menu, page integration, binding margins, page change, centering and the like. Subordinates menus under these will be displayed on touch panel display 130 by touching, taping or double-tapping icons 2102 to 2116 or texts 2112 to 2136.

Arranged in preview region 3000 (FIG. 4) on copy mode initial screen 7100 are a document output (finish) image 3100 and a group of preview select buttons 3010 stated above. In this arrangement, dummy data or scanned data is used to display image 3100, and the image 3100 is changed and displayed in preview region 3000 every time the function setting menu in function selecting region 2000 is changed (the preview display is changed).

Displayed in action panel region 4000 (FIG. 4) on copy mode initial screen 7100 is information such as hint, advice and suggestion for copying operation. Here, recommended functions in the copy mode that the user selects are displayed as shown in FIG. 5. In this case, action panel region 4000 includes an area 4100 for displaying the content of displayed information and areas 4102 to 4106 that serve in themselves as software buttons and display text indicating recommended functions.

When area 4102 is touch-controlled, tapped or double-tapped, a pulldown menu of further detailed information for energy-saving in copying is displayed. In this case, for example a software button for entering the function setting screen for duplex copying is displayed with text "Duplex printing will save paper", a software button for entering the function setting screen for page integration with text "Printing multiple documents integrally will save paper", and a software button for entering the function setting screen for saddle stitch binding with text "Printing can be done so as to bind the paper as a booklet".

Displayed in task trigger region 5000 (FIG. 4) on copy mode initial screen 7100 is a group of command buttons 5100. These command buttons 5100 include a scan-in key (software button) 5102, a clear-all key (software button) 5104, a monochrome start key (software button) 5106 and a color start key (software button) 5108.

Scan-in key 5102 is a key for causing image forming apparatus 100 to scan a document to obtain image data.

Clear-all key 5104 is a key for clearing the set functions.

Monochrome start key 5106 is a key for causing image forming apparatus 100 to scan a document and perform monochrome copying.

Color start key 5108 is a key for causing image forming apparatus 100 to scan a document and perform color copying.

When a color setup key is provided, as a control key for directing image output, either monochrome start key 5106 or color start key 5108 that corresponds to the designated color type may be displayed on the display screen.

In this way, when the user inputs a request in copy mode initial screen 7100 displayed with information in five-divided regions, a copying process is implemented in accordance with the request.

Next, the display modes of the touch panel display in image forming apparatus 100 will be described with reference to the drawings.

Figure 6:
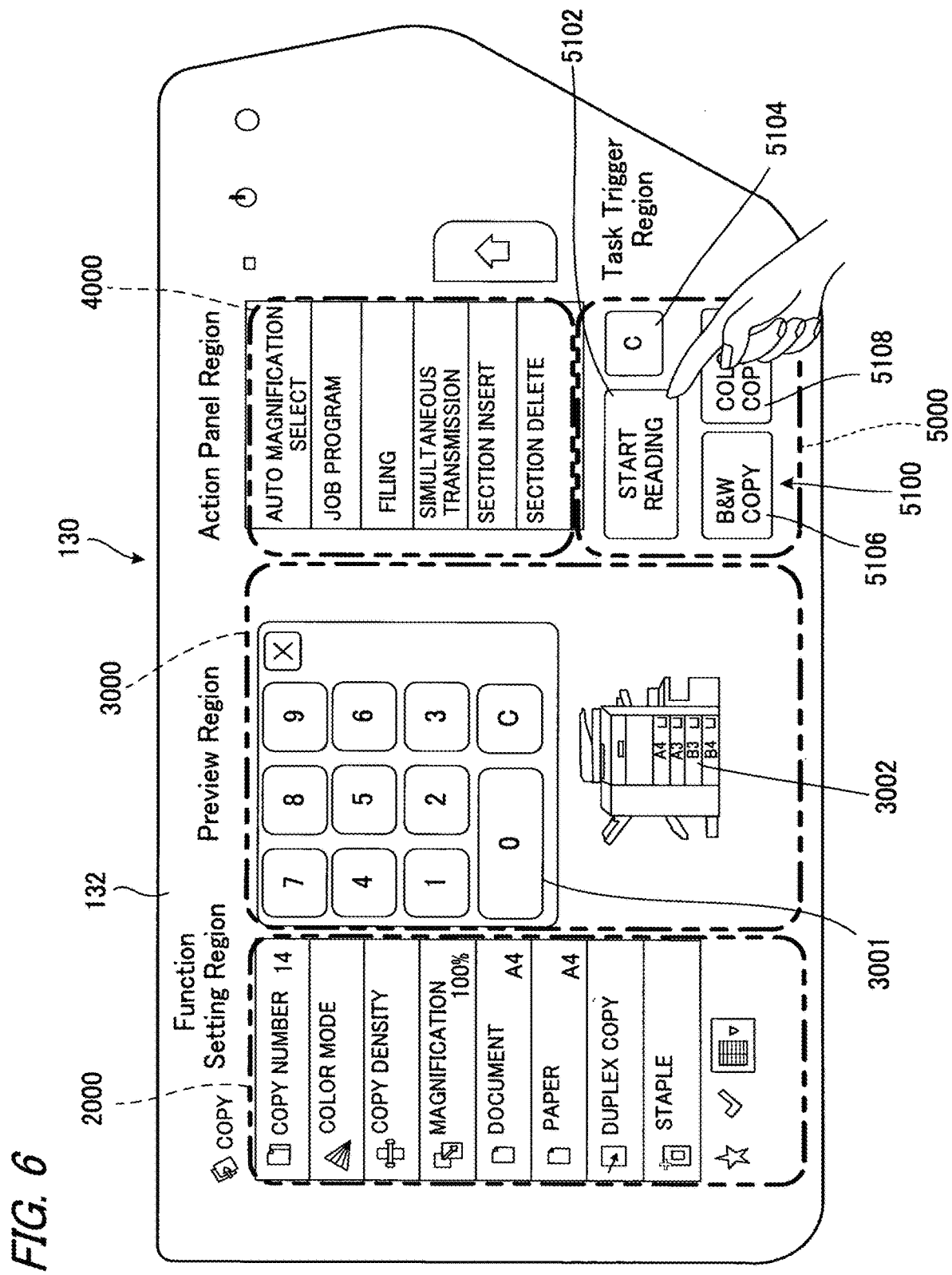
FIG. 6 is an illustrative view showing one display mode example of a display panel of the touch panel display.

FIG. 6 is an illustrative view showing one display mode example of the touch panel display in the image forming apparatus.

As shown in FIG. 6, arranged on touch panel display 130 in image forming apparatus 100 are preview region 3000 in the center of the screen and function selecting region 2000 on the left side of preview region 3000. Action panel region 4000 is laid out on the upper right of preview region 3000, and task trigger region 5000 is arranged under the action panel region 4000.

Displayed in preview region 3000 are a virtual ten-key pad 3001 and a mimic display 3002 giving an image of the whole apparatus.

Displayed in task trigger region 5000 is a group of command buttons 5100.

In the group of command buttons 5100, scan-in key 5102, clear-all key 5104, monochrome start key 5106 and color start key 5108 are laid out.

Next, the electric configuration related to the screen display of control unit 120 will be described with reference to the drawings.

Figure 7:
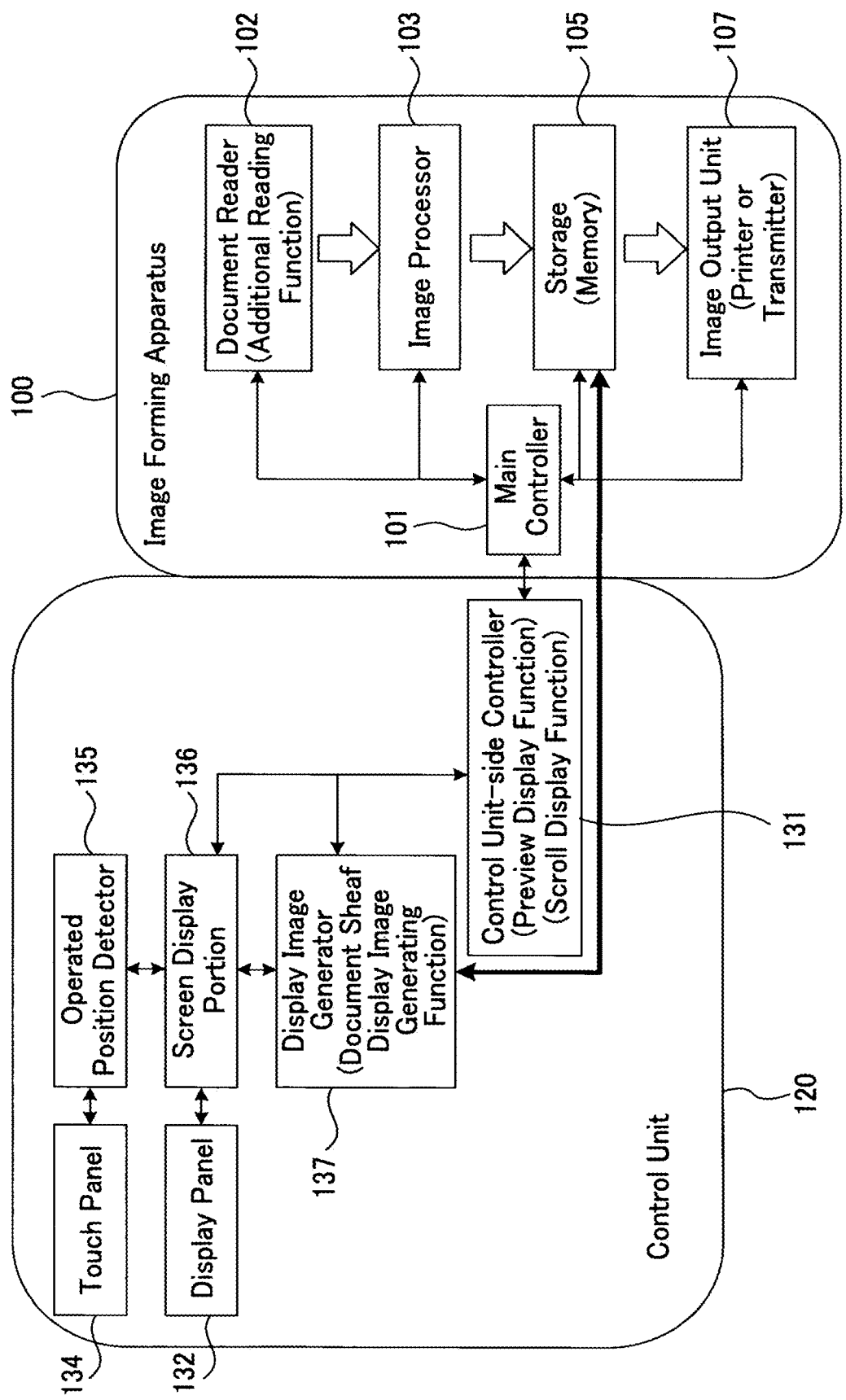
FIG. 7 is a block diagram showing an electric configuration of a control unit in the image forming apparatus.
Figure 8:
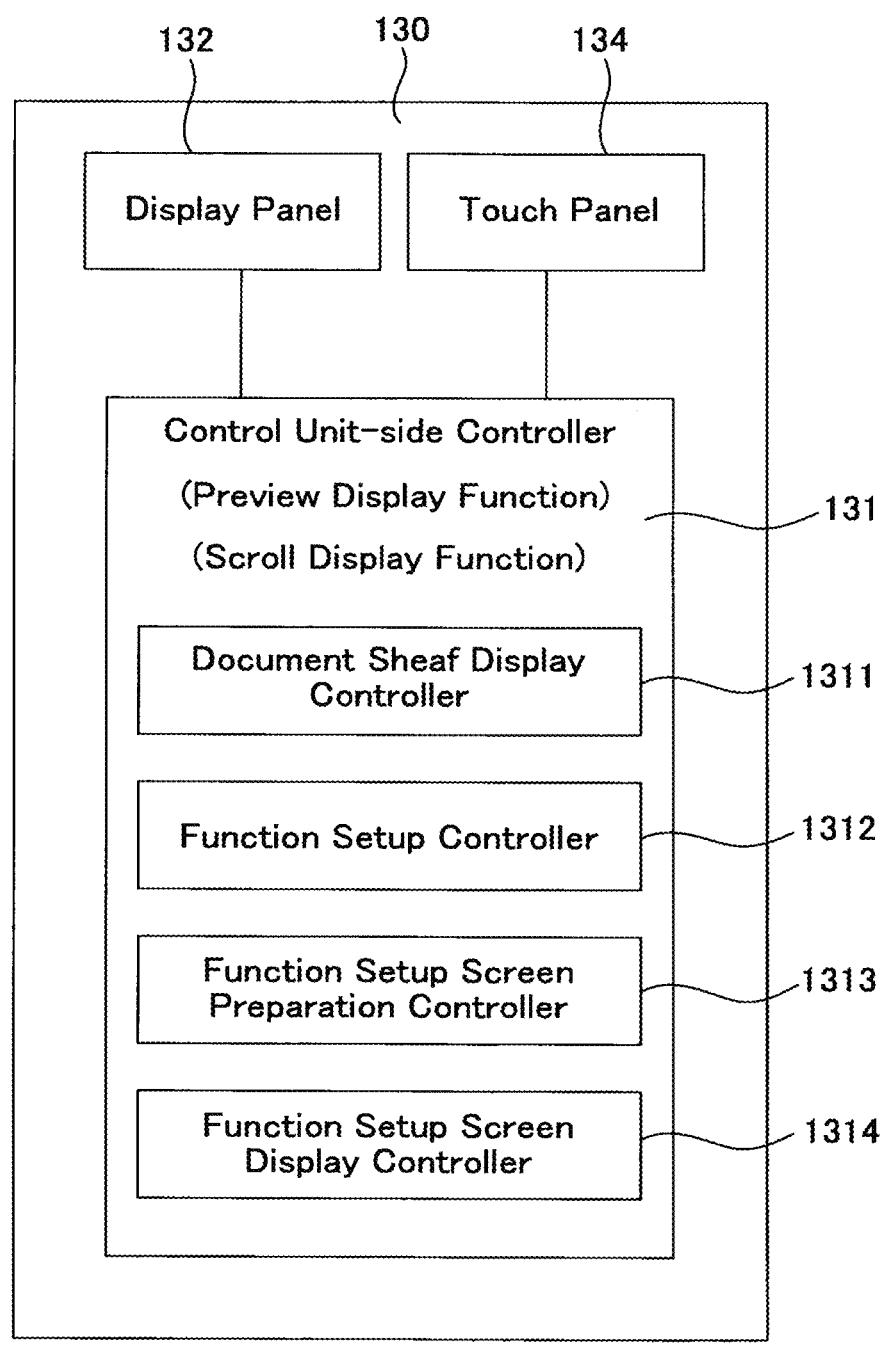
FIG. 8 is a block diagram showing a configuration of the touch panel display of the control unit.

FIG. 7 is a block diagram showing an electric configuration of a control unit in the image forming apparatus. FIG. 8 is a block diagram showing a configuration of the touch panel display of the control unit.

As shown in FIG. 7, control unit 120 includes, in addition to display panel 132 and touch panel 134, an operated position detector 135, a screen display portion 136, a display image generator 137 and control unit-side controller (display controller) 131 for controlling processing and operation in control unit 120.

Image forming apparatus 100 includes document reader 102 for capturing image data, an image processor 103, a storage 105 for storing image data input through document reader 102 and an image output unit 107 such as a printer, transmitter or the like for outputting images, all being operated and controlled by a main controller 101.

Document reader 102 has an additional reading function which enables additional reading (additional input) of additional documents after completion of reading of desired documents (image data).

Operated position detector 135 detects the operated position on touch panel 134.

Screen display portion 136 displays an image formed by display image generator 137 on display panel 132.

Display image generator 137 prepares a predetermined image based on image data input to the main body of image forming apparatus 100, following instructions from control unit-side controller 131 and also has a function of forming display images of document sheaves (image data) consisting of a series of multiple documents scanned by image reader 102 (document sheaf display image generating function).

Control unit-side controller 131 is connected to main controller 101 of the main body of image forming apparatus 100 and functions as a controller in touch panel display 130.

Now, control unit-side controller 131 will be described in detail.

As shown in FIG. 8, control unit-side controller 131 has a preview display function of giving a display image based on the documents scanned by document reader 102 on touch panel display 130 in a preview representation and a scroll display function of multiple pages of display images given in a preview representation in a movable manner.

Control unit-side controller 131 further includes a document-sheaf display controller 1311 that provides a display image of a document sheaf made up of a series of multiple documents scanned by document reader 102, and gives display images of multiple document sheaves, including a display image of a document sheaf based on the documents scanned before an additional scanning of documents (which will be called hereinbelow a "previously scanned document sheaf") and a display image of a document sheaf based on the documents additionally scanned (which will be called hereinbelow as an "additional document sheaf"), in a preview representation in a distinctive manner on touch panel display 130.

Control unit-side controller 131 includes: a function setup controller 1312 having a function of setting up image output conditions of the images to be output from image output unit 107; a function setup screen preparation controller 1313 for preparing a function setup screen 1312a (FIG. 10) that is related so as to actuate function setup controller 1312; and a function setup screen display controller 1314 for displaying function setup screen 1312a on display panel 132.

Figure 10:
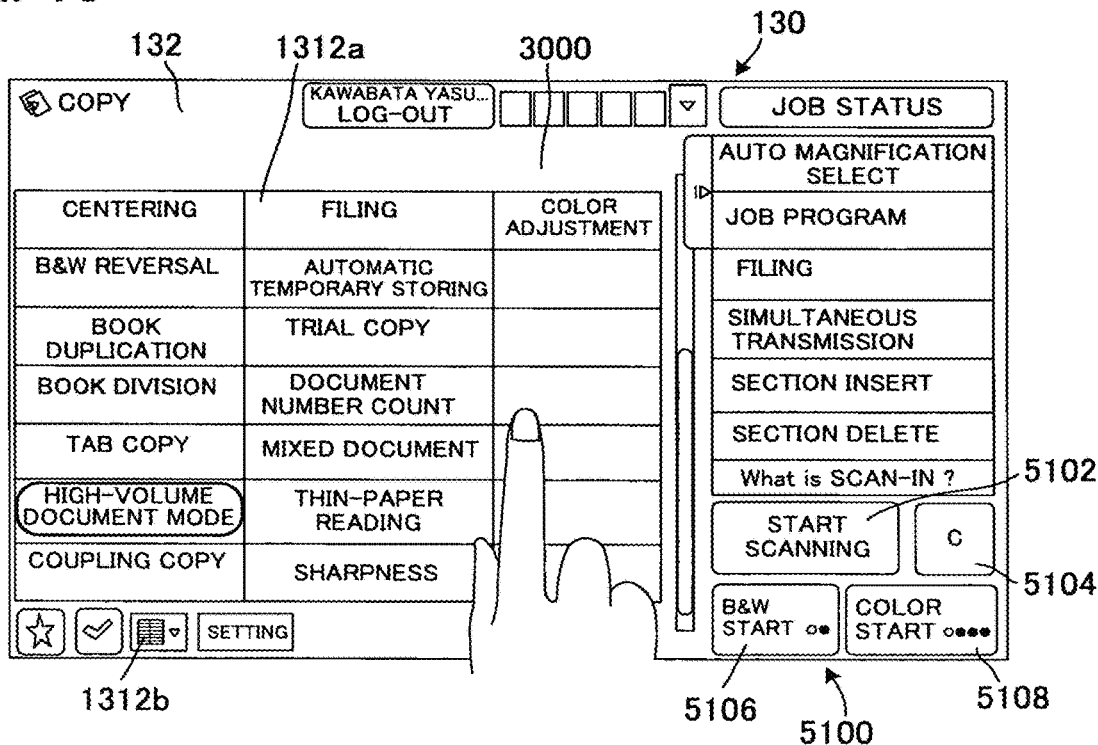
FIG. 10 is an illustrative view showing a display screen when document output conditions are set up in high-volume document mode in the image forming apparatus.

Function setup controller 1312 includes high-volume document mode (additional input mode) having a function of reading a plurality of documents, by a multiple number of times (FIG. 10). The high-volume document mode has an individual setup function for setting up different image output conditions for each individual document sheaf among the scanned multiple sheaves of documents and an all-in setup function for setting up the same image output conditions for all the scanned multiple sheaves of documents.

Here, the high-volume document mode in the present embodiment may include a case where if, for example the volume of documents to be scanned exceeds the number of sheets accommodatable to the ADF (automatic document feeder), the remaining documents can be added later (additionally scanned) after a suspension of scanning. That is, after setting the documents to be added to the ADF, start key 5106 or 5108 (FIG. 5) is pressed down to restart reading.

Further, when high-volume document mode is set up, and if the image output conditions (the second image output conditions) for an additional document sheaf are different from the image output conditions (the first image output conditions) for the previously scanned document sheaf, function setup controller 1312 makes the image output conditions (the second image output conditions) valid for only the additional documents that are scanned after setup of the new image output conditions (the second image output conditions).

Also, when high-volume document mode is set up, function setup controller 1312 permits the image output conditions (the second image output conditions) for the additional document sheaf to be set up for all the functions.

Further, when high-volume document mode is set up and if setup of the same image output conditions (the first image output conditions=the second image output conditions) for all the multiple sheaves of documents is directed, it is possible to set up an all-in finishing process for the multiple document sheaves.

When high-volume document mode is set up, control unit-side controller 131 displays a single control key as the control key for directing image output, on display panel 132.

When high-volume document mode is not set up and if the second image output conditions for an additional document sheaf are different from the first image output conditions for the previously scanned document sheaf, the second image output conditions for the additional document sheaf are made valid for all the documents including the document sheaf before additional reading.

As a variational example, control unit-side controller 131 may include a setup direction controller that, when high-volume document mode is selected, sets up the same image output conditions for all the scanned multiple document sheaves (the previously scanned document sheaf and additional document sheaf) at the stage where additional document reading has been completed after change of the setup of the second image output conditions for the additional document sheaf of data, and the setup directing key for this setup direction controller may be displayed on display panel 132. For example, function setup controller 1312 may be allotted as the setup direction controller, and an aftermentioned setup change key 5109 in FIG. 12 may be allotted as the setup directing key.

Further, in the case of additional input mode, since color setting may be different from one unit of image data to another, if there exist multiple control keys to start copying (monochrome start key 5106 and color start key 5108) there is a fear that the user is confused. To deal with this, displaying only a single control key corresponding to the color setting, on the display screen enables the user to start a copying operation without confusion.

Next, some examples of additional reading of documents being implemented by document reader 102 will be described with reference to the drawings.

EXAMPLE 1

Example 1 shows a case where document reading is set into high-volume document mode in image forming apparatus 100 and additional document scanning is implemented.

Figure 9:
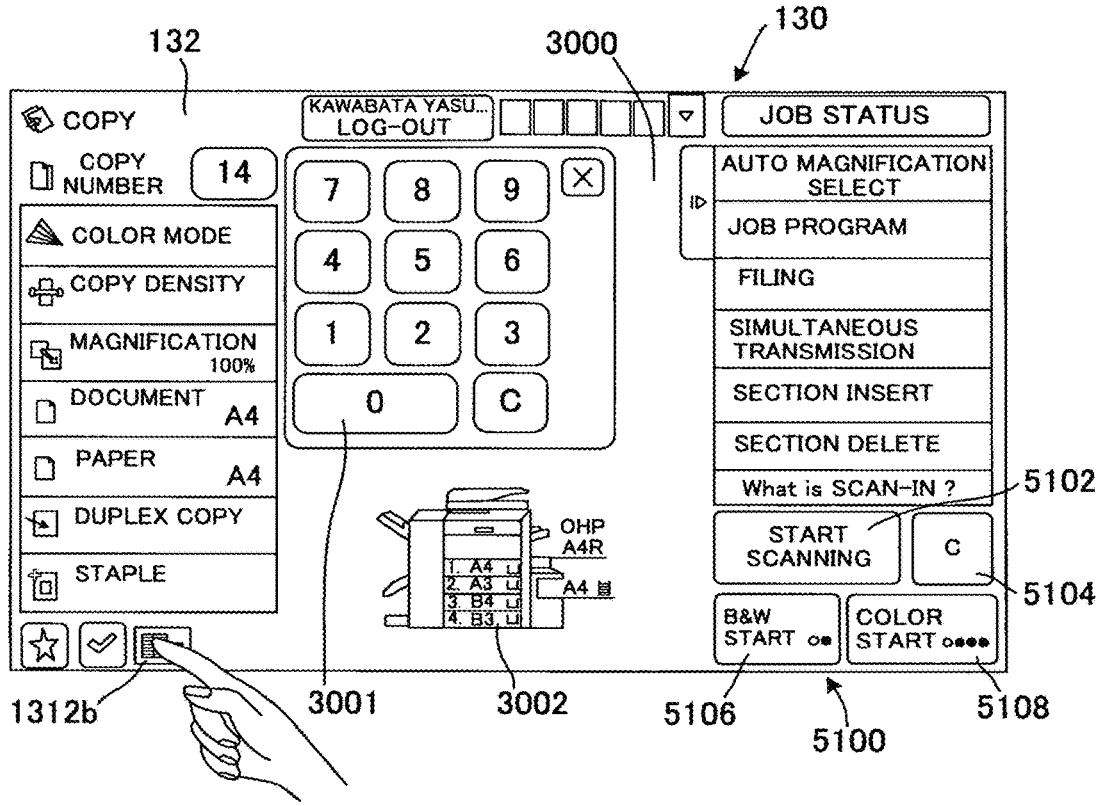
FIG. 9 is an illustrative view showing an initial screen in copy mode in an image forming apparatus of example 1.
Figure 11:
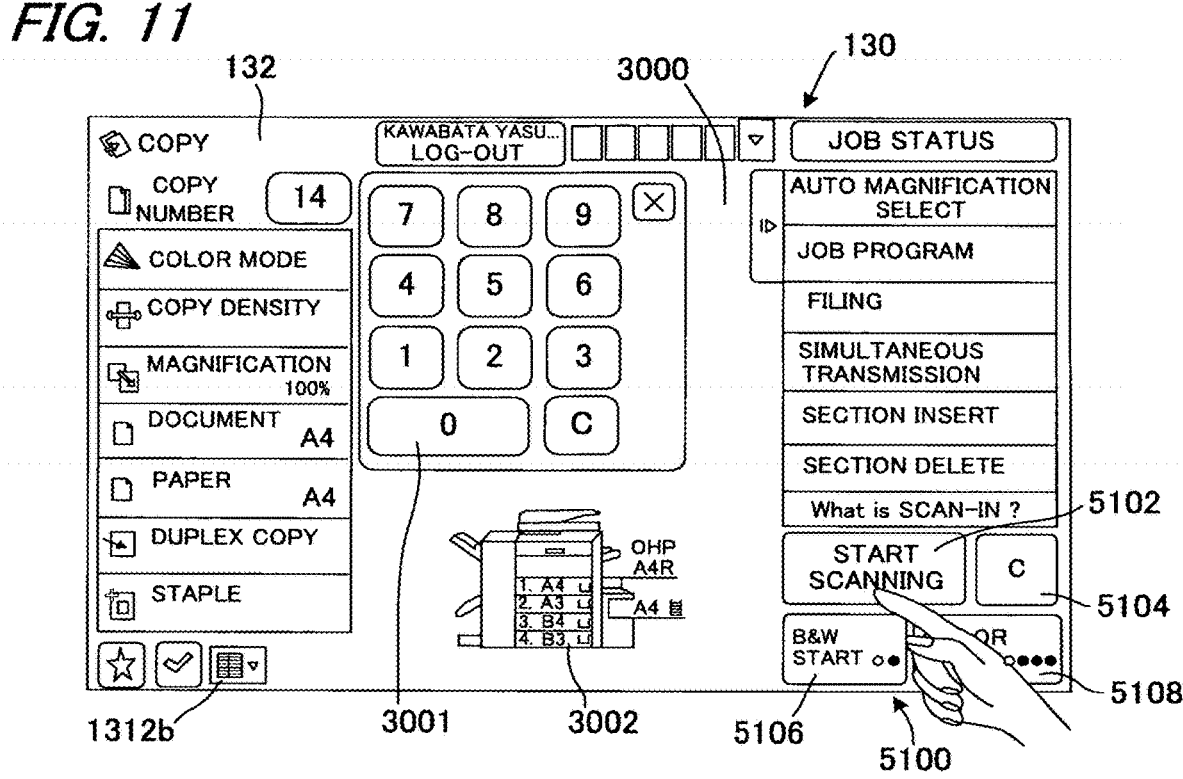
FIG. 11 is an illustrative view showing the basic screen in copy mode when setup of document output conditions in high-volume document mode is completed in the image forming apparatus.
Figure 12:
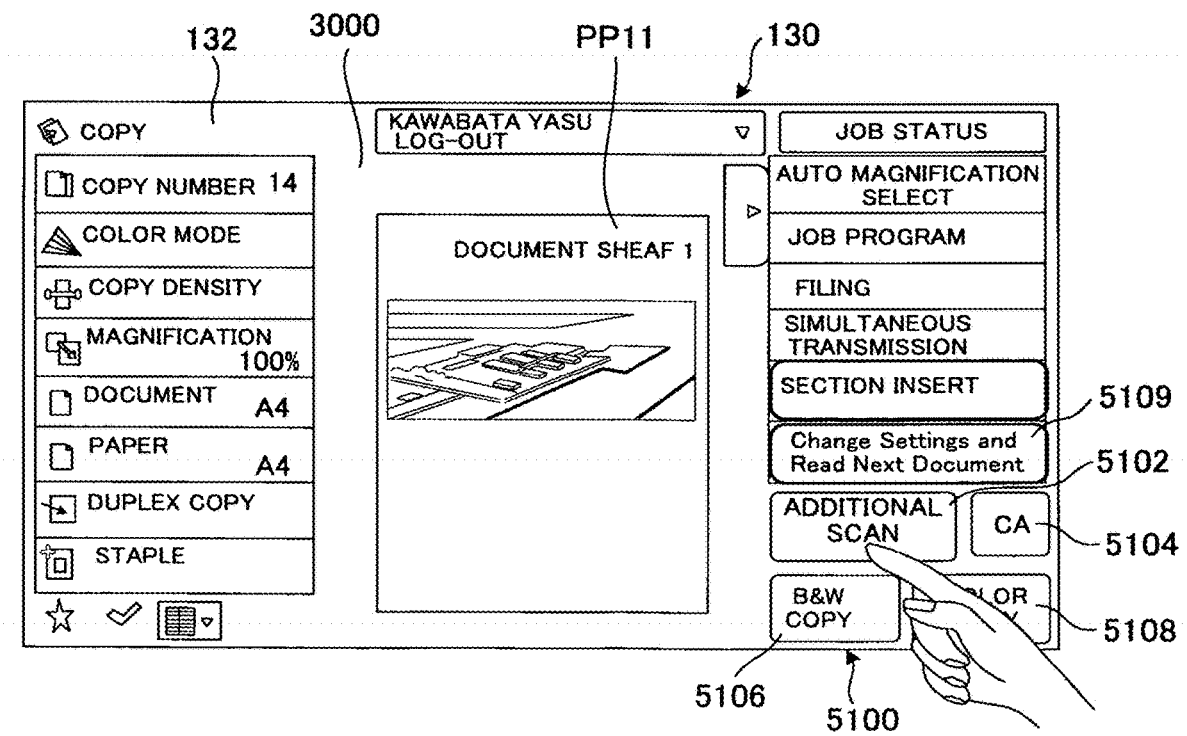
FIG. 12 is an illustrative view showing a display screen on which preview display of a document sheaf is given after a document reading operation has been completed in the image forming apparatus.
Figure 13:
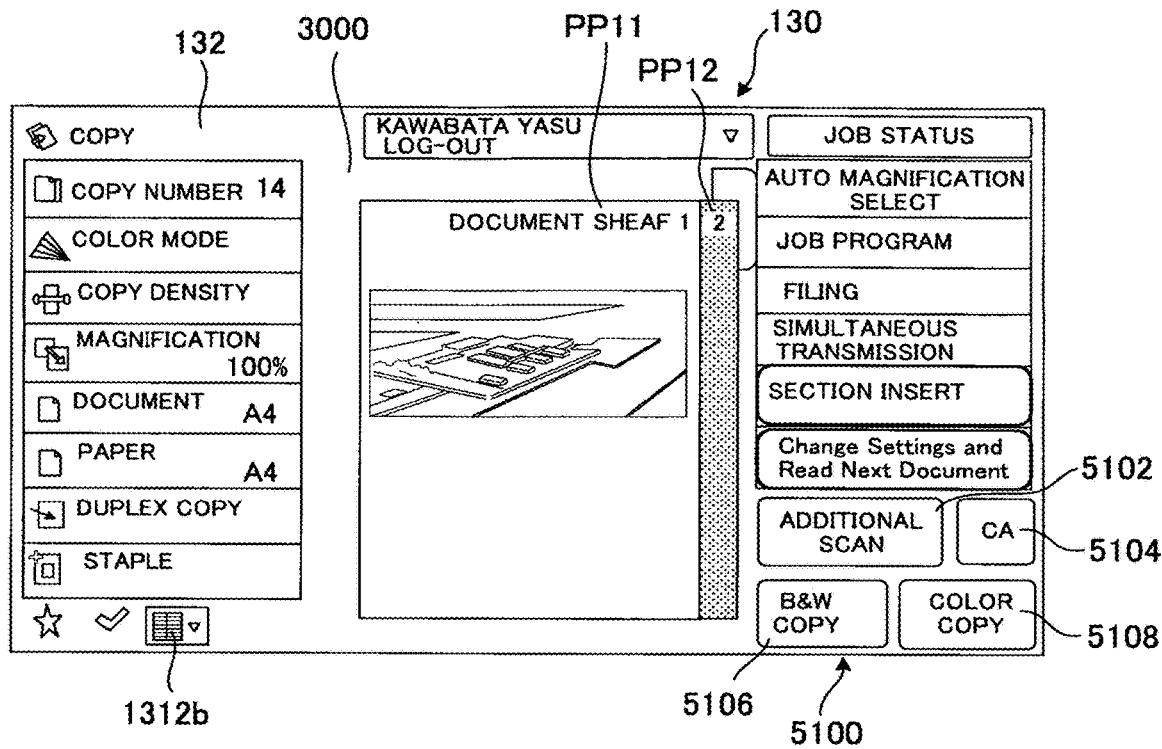
FIG. 13 is an illustrative view showing a display screen on which preview display of a plurality of document sheaves including an additional document sheaf is given when an additional reading operation has been performed after a document reading operation in the image forming apparatus.
Figure 14:
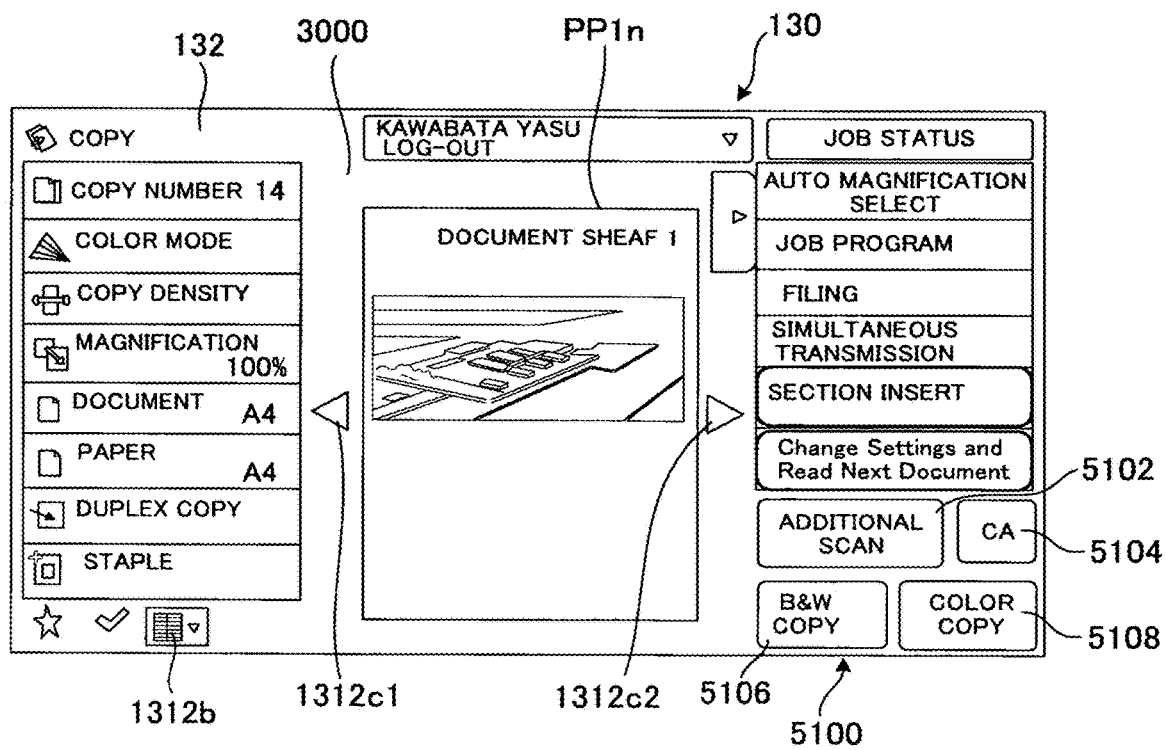
FIG. 14 is an illustrative view showing another preview display example representing scanned document sheaves.

FIG. 9 is an illustrative view showing the initial screen in copy mode in the image forming apparatus of example 1. FIG. 10 is an illustrative view showing the display screen when document output conditions are set up in high-volume document mode in the image forming apparatus. FIG. 11 is an illustrative view showing the basic screen in copy mode when setup of document output conditions in high-volume document mode is completed in the image forming apparatus. FIG. 12 is an illustrative view showing a display screen on which preview display of a document sheaf is given after a document reading operation has been completed in the image forming apparatus. FIG. 13 is an illustrative view showing a display screen on which preview display of a plurality of document sheaves including an additional document sheaf is given when an additional reading operation has been performed after a document reading operation in the image forming apparatus. FIG. 14 is an illustrative view showing another preview display example representing scanned document sheaves.

When documents to be copied are read in high-volume document mode in image forming apparatus 100, the user selects the copy mode in the home screen displayed on touch panel display 130 to display the initial screen in copy mode as shown in FIG. 9.

Then, the user touches a special function key 1312b displayed on display panel 132 so that a function setup screen 1312a is displayed on display panel 132 as shown in FIG. 10. The user then selects the high-volume document mode and sets up the image output conditions when scanned documents in high-volume document mode is output.

Further, the user touches scan-in key 5102 to start document reading as shown in FIG. 11. In this case, a plurality of documents of, for example A4 size are set in long-edge feed orientation in document reader 102 (FIG. 1).

When the documents are scanned by document reader 102, a display image of a document sheaf consisting of multiple documents is generated based on the image data of the scanned multiple documents by display image generator 137 (FIG. 7), and a first document sheaf PP11 (previously scanned document sheaf) is displayed in the center of preview region 3000, as shown in FIG. 12. At this time, the image information on the front page of the scanned documents is displayed on the first document sheaf image PP11. The display of scan-in key 5102 is changed from "START SCANNING" to "ADDITIONAL SCAN". In this stage, setup of the image output conditions for the next document can be modified by touching a setup change key 5109. Though in the present embodiment, setup change key 5109 is shown in a descriptive manner with "Change Settings and Read Next Document", the key should not be limited to this. That is, any descriptive form, symbol (including an icon) or the likely may be used as long as it can make the user understand that the key is one that the user should press or operate when the setup of image output conditions for the next document is modified.

Then, when additional reading is implemented, a second document sheaf image (additional document sheaf image) PP12 is generated by display image generator 137 as shown in FIG. 13, based on the image data of additionally scanned, multiple documents and displayed in preview region 3000. The second document sheaf image PP12 is displayed in the same size as the first document sheaf image PP11 and overlapped behind first document sheaf image PP11. That is, the second document sheaf image PP12 is laid out with part of it exposed from behind the first document sheaf image PP11 so as to have its existence recognized.

Though in example 1, preview display is given in preview region 3000 by placing document sheaf PP11 over part of document sheaf PP12, as a variational example page-flip buttons 1312c1 and 1312c2 may be displayed on both sides (at one of the sides when the first or last document sheaf image is displayed) of the preview of document sheaf PP1n in preview region 3000, as shown in FIG. 14.

With this arrangement it is possible to easily display the sheaves of documents that have been scanned initially or additionally, by touching page-flip buttons 1312c1 or 1312c2.

Next description will be made on a case of image output in example 1 when the setup of the image output conditions for the documents to be additionally scanned in high-volume document mode is modified.

Figure 15A:
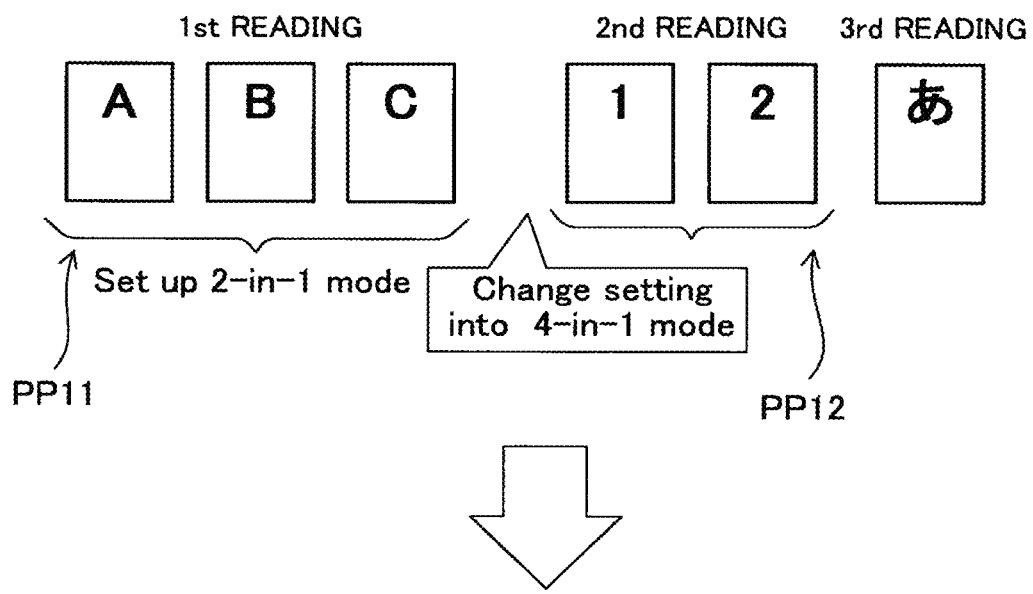
FIG. 15A is an illustrative view showing a state where the setup of image output conditions is modified at the time of additional reading in high-volume document mode in the image forming apparatus of example 1.
Figure 15B:
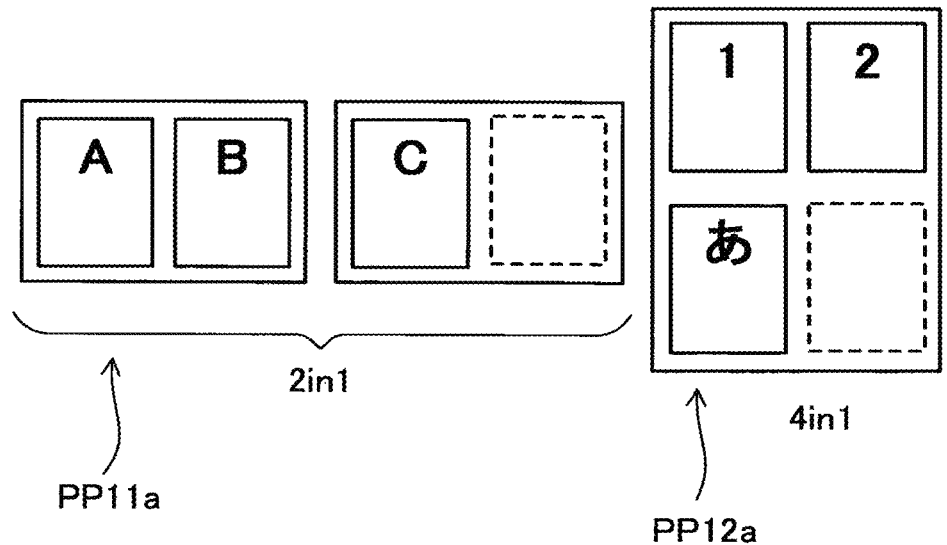
FIG. 15B is an illustrative view showing a state of image output in high-volume document mode.

FIG. 15A is an illustrative view showing a state where the setup of image output conditions is modified at the time of additional reading in high-volume document mode in the image forming apparatus of example 1. FIG. 15B is an illustrative view showing the state of image output in high-volume document mode.

In image forming apparatus 100, when, in high-volume document mode the "2 in 1" setting in the image output conditions at the first image reading has been changed to the "4 in 1" setting at the second image reading, documents are captured as shown in FIG. 15A. Here, the image output condition "N in 1" is the setting for forming N document images on one page of recording paper. Accordingly, the "2 in 1" setting is to form two document images on one page of recording paper, whereas the "4 in 1" setting is to form four document images on one page of recording paper.

The image output at this time is given such that document sheaf PP11 scanned at the first scanning is output in "2 in 1" mode while document sheaf PP12 scanned at and after the second scanning is output in "4 in 1" mode as shown in FIG. 15B. Here, a symbol PP11a indicates the output images of document sheaf PP11, and PP12a the output images of document sheaf PP12.

EXAMPLE 2

Example 2 shows a case where document reading is set in normal mode in image forming apparatus 100 and additional document scanning is implemented.

Figure 16:
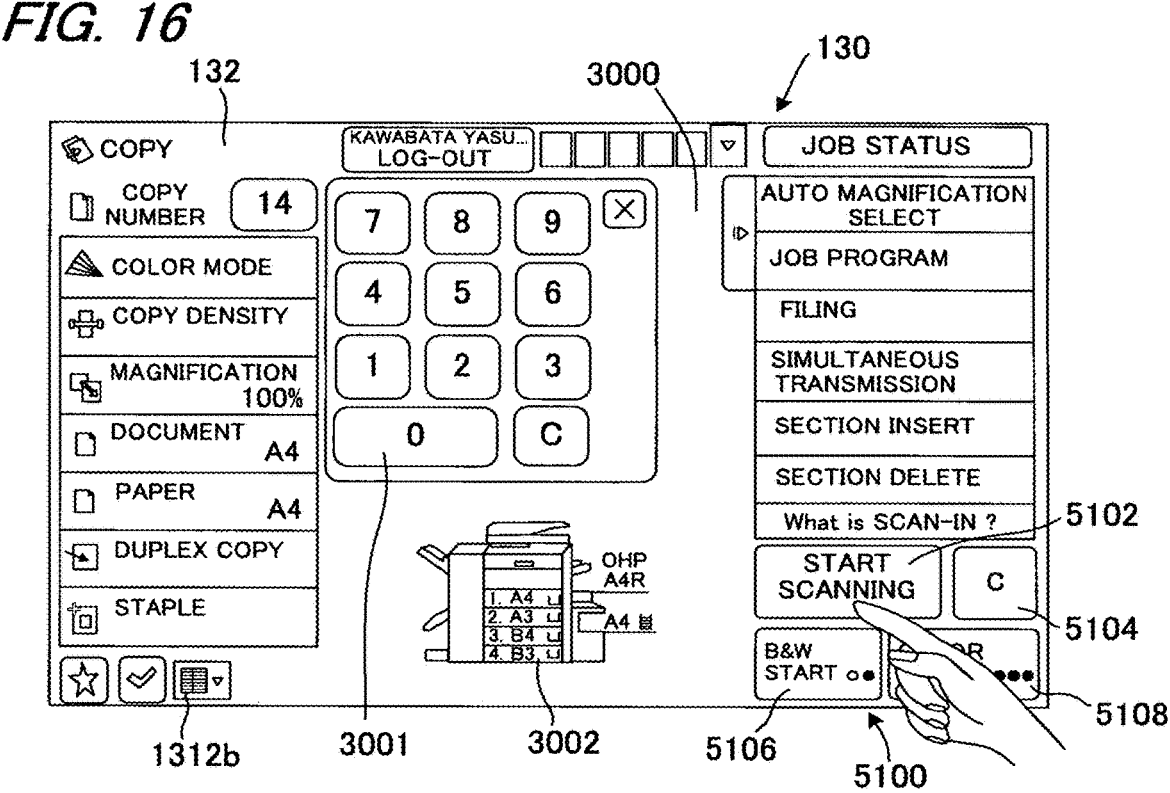
FIG. 16 an illustrative view showing an initial screen in copy mode in an image forming apparatus of example 2.
Figure 17:
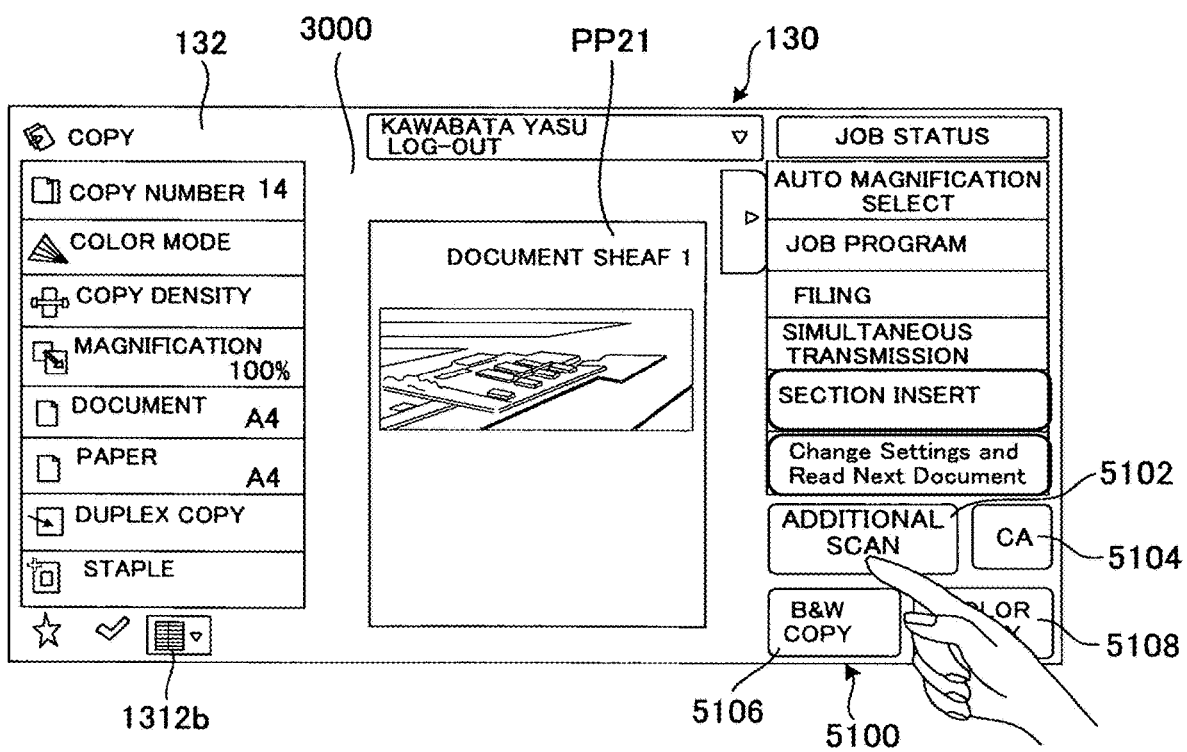
FIG. 17 is an illustrative view showing a display screen on which preview of a document sheaf is displayed after document reading has been completed in the image forming apparatus.

FIG. 16 is an illustrative view showing an initial screen in copy mode in the image forming apparatus of example 2. FIG. 17 is an illustrative view showing a display screen on which preview of a document sheaf is displayed after document reading has been completed in the image forming apparatus.

When documents to be copied are read in normal mode in image forming apparatus 100, the user displays the initial screen in copy mode and directly touches scan-in key 5102 to start document reading as shown in FIG. 16.

When the documents are scanned by document reader 102, a display image of a document sheaf consisting of multiple documents is generated based on the image data of the scanned multiple documents by display image generator 137, and a first document sheaf PP21 is displayed in the center of preview region 3000, as shown in FIG. 17. At this time, the image information on the front page of the scanned documents is displayed on the first document sheaf PP21. The display of scan-in key 5102 is changed from "START SCANNING" to "ADDITIONAL SCAN".

Then, when additional reading is implemented, the user touches scan-in key 5102 to actuate additional reading.

Next description will be made on one image output case in example 2 when the setup of the image output conditions for the documents to be additionally scanned in normal mode is modified.

Figure 18A:
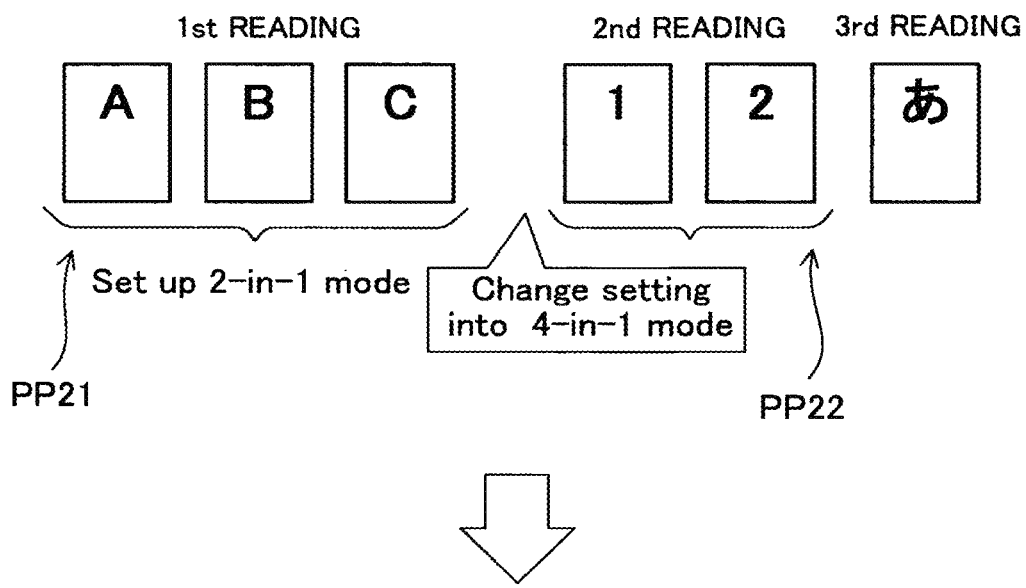
FIG. 18A is an illustrative view showing a state where the setup of image output conditions is modified in normal mode at the time of additional reading in the image forming apparatus of example 2; and, FIG. 18B is an illustrative view showing the state of image output in normal mode.
Figure 18B:
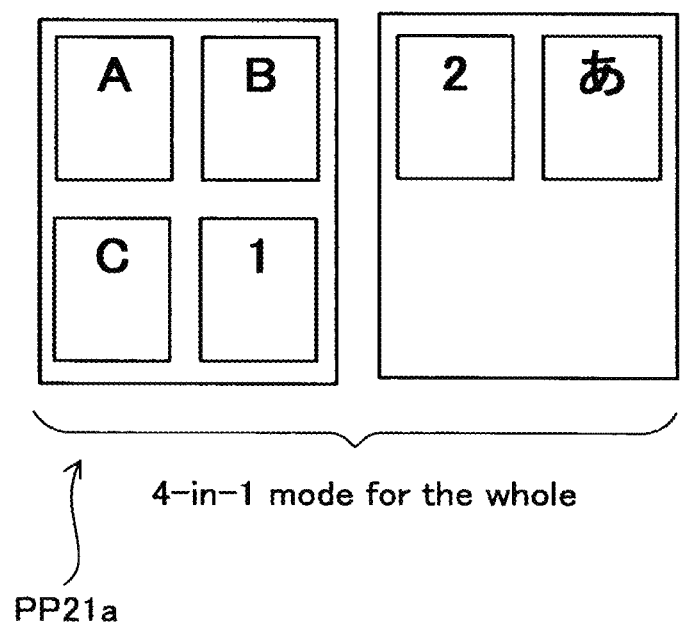

FIG. 18A is an illustrative view showing a state where the setup of image output conditions is modified in normal mode at the time of additional reading in the image forming apparatus of example 2. FIG. 18B is an illustrative view showing the state of image output in normal mode.

In image forming apparatus 100, when, in normal mode, the "2 in 1" setting in the image output conditions at the first image reading has been changed to the "4 in 1" setting at the second image reading, documents are captured as shown in FIG. 18A.

At this time, the image output of document sheaf PP21 scanned at the first scanning is set with the same settings, i.e., the modified settings, for document sheaf P22 scanned at and after the second reading, so that the whole output is given as "4 in 1" output images PP21a as shown in FIG. 18B.

As described above, in image forming apparatus 100 including control unit 120 having a function of setting up image output conditions for images to be output based on input image data, control unit-side controller 131 of control unit 120 includes function setup controller 1312, function setup screen preparation controller 1313 and function setup screen display controller 1314, function setup controller 1312 includes high-volume document mode having a function of reading multiple documents by a multiple number of times to form multiple document sheaves, and the high-volume document mode includes an individual setup function for setting up individual image output conditions for each document sheaf among the scanned multiple sheaves of documents and an all-in setup function for setting up the same image output conditions for all the scanned multiple sheaves of documents. Accordingly, it is possible for the user to select the image output settings in accordance with the finish the user wants, by selecting an appropriate mode for each job, for example, setting up "4 in 1" setting in addition to "2 in 1" setting, or modifying the whole output setting into "4 in 1" setting.

The above embodiment and examples were described taking cases in which control unit 120 is applied to image forming apparatus 100 shown in FIG. 1. However, as long as it is an image forming apparatus that includes a control unit having a function setup means including a function of setting output image conditions of images to be output, the invention can be applied to any other image forming apparatus and the like, not limited to the image forming apparatus and copier having the configuration described above.

Though the above embodiment and examples were described taking cases where each document sheaf is composed of multiple documents, it goes without saying that the invention includes a case where each document sheaf is composed of a single document.

Having described heretofore, the present invention is not limited to the above embodiment and examples, various changes can be made within the scope of the appended claims. That is, it is apparent that various kinds of variations and modified examples will occur to those skilled in the art within the scope of the appended claims. That is, any embodied mode obtained by combination of technical means modified as appropriate without departing from the spirit and scope of the present invention should be included in the technical art of the present invention.

What is claimed is:

1. An image output apparatus comprising:
   an input unit that inputs a document as an image data; and
   a communication unit that transmits the image data input from the input unit; wherein
   when a new image data is input by reading the document placed on a document table, the image output apparatus is configured to be capable of additionally inputting the new image data even after a previously input image data has been input.

2. The image output apparatus according to claim 1, wherein, the image output apparatus has an additional input function of being able to input a plurality of documents, by a multiple number of times and when the new image data is input by reading the document placed on the document table, even if the additional input function is not set up to be valid, the new image data can be input additionally after the previously input image data has been input.

3. The image output apparatus according to claim 1, wherein, the image output apparatus is configured to be capable of receiving instructions to start output of the previously input image data before the additional input of the new image data.

4. The image output apparatus according to claim 1, wherein, the image output apparatus is configured to be capable of displaying an image outputting condition set up for the previously input image data before the additional input of the new image data.

5. The image output apparatus according to claim 1, wherein, the image output apparatus is configured to be capable of changing an image outputting condition before the additional input of the new image data.

6. The image output apparatus according to claim 1, wherein, when an image outputting condition is changed before the additional input of the new image data, the changed image outputting condition is made valid for the previously input image data being input previously and for the new image data to be input additionally.

7. The image output apparatus according to claim 1, wherein, when an image outputting condition is changed before the additional input of the new image data in a state where an additional input function is set up to be valid, the change is made valid for the new image data to be input additionally.

8. A control method for an image output apparatus including an input unit that inputs a document as image data, and a communication unit that transmits the image data input from the input unit, the method comprising:
   an image data additional inputting step of, even after a previously input image data has been input by reading the document placed on a document table, additionally inputting a new image data.

* * * * *